(12) United States Patent
Endo

(10) Patent No.: US 6,522,429 B2
(45) Date of Patent: Feb. 18, 2003

(54) FACSIMILE MACHINE AND FACSIMILE COMMUNICATION SYSTEM

(75) Inventor: Hiroshi Endo, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 10/103,185

(22) Filed: Mar. 21, 2002

(65) Prior Publication Data

US 2002/0101613 A1 Aug. 1, 2002

Related U.S. Application Data

(63) Continuation of application No. 09/290,762, filed on Apr. 13, 1999, now Pat. No. 6,381,038.

(30) Foreign Application Priority Data

Apr. 21, 1998 (JP) .......................................... 10-126843

(51) Int. Cl.[7] ................................................ H04N 1/00
(52) U.S. Cl. ........................ 358/400; 358/405; 358/406; 358/407
(58) Field of Search ................................ 358/400, 401, 358/405, 406, 407, 434, 435, 436, 439; 379/100.01

(56) References Cited

U.S. PATENT DOCUMENTS

| 5,828,465 | A | | 10/1998 | Muramatsu et al. | |
|---|---|---|---|---|---|
| 5,949,861 | A | | 9/1999 | Chan et al. | |
| 6,044,137 | A | * | 3/2000 | O'Toole | 379/100.14 |
| 6,259,538 | B1 | * | 7/2001 | Amit | 358/442 |
| 6,381,038 | B1 | * | 4/2002 | Endo | 358/400 |
| 2001/0033642 | A1 | * | 10/2001 | Abrishami | 379/100.01 |
| 2002/0001373 | A1 | * | 1/2002 | Sakurai | 379/100.12 |
| 2002/0034284 | A1 | * | 3/2002 | Kang | 379/100.06 |
| 2002/0097445 | A1 | * | 7/2002 | Hatashita | 358/402 |
| 2002/0101613 | A1 | * | 8/2002 | Endo | 358/1.15 |

FOREIGN PATENT DOCUMENTS

| JP | 404129358 A | 4/1992 |
|---|---|---|
| JP | 408265491 A | 10/1996 |

* cited by examiner

*Primary Examiner*—Jerome Grant, II
(74) *Attorney, Agent, or Firm*—Akin Gump Strauss Hauer & Feld, L.L.P

(57) ABSTRACT

A facsimile communication system includes a calling and a called facsimile machine connected via a communication network. Each of the facsimile machines has a timer value representing a maximum allowable response time for a response signal relative to a signal transmitted to the counterpart facsimile machine. Using the timer value, each of the facsimile machines monitors whether the response signal is received from the counterpart facsimile machine within the timer value. If the response signal is not received within the timer value, retransmission of the transmitted signal is required. The called facsimile machine transmits all timer value change information for increasing the timer value to the calling facsimile machine. The calling facsimile machine selects the optimum timer value change information within the range of the timer value change information received from the called facsimile machine, and transmits the selected timer value change information to the called facsimile machine. The calling and called facsimile machines increase their timer values using the selected timer value change information. Accordingly, even if a communication delay is caused in the communication network, the retransmission of the transmitted signal can be avoided.

8 Claims, 18 Drawing Sheets

FACSIMILE MACHINE AND FACSIMILE COMMUNICATION SYSTEM

CROSS-REFERENCE TO RELATED APPLICATIONS

This application is a continuation of U.S. Non-Provisional Patent Application No. 09/290,762 filed Apr. 13, 1999, now U.S. Pat. No. 6,381,038.

BACKGROUND OF THE INVENTION

The present invention relates to a facsimile machine and a facsimile communication system for carrying out facsimile communication via a communication network, such as a packet communication network, which differs from a public telephone network.

BRIEF SUMMARY OF THE INVENTION

A communication procedure between facsimile machines connected to the telephone network is regulated by the ITU-T (International Telecommunication Union-Telecommunication Standardization Sector) Recommendation T. 30. In this communication procedure, after a call is set, image data is transmitted and received between facsimile machines while given control signals are exchanged in order. For confirming whether the communication is normally executed, each of the facsimile machines monitors whether a response signal is received from the counterpart facsimile machine within a given time in response to a certain signal transmitted thereto. If no such a response signal is received within the given time, the foregoing certain signal is retransmitted to the counterpart facsimile machine. Then, if no such a response signal is received even after given number times repetition of the retransmission, the facsimile machine judges that a transmission failure has occurred, and forcibly stops or interrupts the communication with the counterpart facsimile machine.

In recent years, following the rapid spread of the Internet, a communication procedure for realizing facsimile communication via the Internet has been proposed. Facsimile machines are connected to the telephone network, while the telephone network is connected to the packet communication network forming the Internet via gateways.

One of the facsimile machines is connected to one of the gateways via the telephone network, while another facsimile machine is connected to another gateway via the telephone network. The gateways are connected to each other via the packet communication network.

Between the facsimile machine and the gateway connected thereto via the telephone network, communication is carried out pursuant to the communication procedure regulated by the ITU-T Recommendation T. 30. On the other hand, between the gateways connected via the packet communication network, communication is carried out pursuant to a communication procedure regulated by the ITU-T Recommendation T. 38.

The conventional communication technique, however, has the following problem to be solved.

Since the packet communication network deals with a large number of communications at a given frequency band, if the traffic amounts increase, it is possible that large communication delays are generated locally. Thus, it is possible that a significant communication delay occurs between the gateways while facsimile communication is executed. If a communication delay occurs between the gateways, such a communication delay is transferred, as it is, to the telephone network connecting between the facsimile machine and the gateway. According to the communication procedure regulated by the ITU-T Recommendation T. 30, if a communication delay larger than a given value is generated, it is judged that a communication failure has occurred so that facsimile communication is forcibly interrupted.

FIG. 19 is a sequence diagram showing an example wherein facsimile communication is interrupted due to a communication delay caused between gateways.

In this example, when the line connection is established through an exchange of various control signals after a call is made, image data is transmitted from a calling facsimile machine to a calling-side gateway. The image data should then be transmitted from the calling-side gateway to a called-side gateway and further transmitted from the called-side gateway to a called facsimile machine.

Following the transmission of the image data, the calling facsimile machine transmits an EOP (End of Procedures) signal and then goes into a standby state awaiting an MCF (Message Confirmation) signal to be sent from the called facsimile machine in response to the EOP signal.

However, if a large communication delay is caused in the packet communication network connecting between the calling-side gateway and the called-side gateway, the image data transmitted from the calling-side gateway is received, but being largely delayed, at the called-side gateway. Thus, it is possible that the called facsimile machine can not receive the image data within a lapse of a given time from the transmission of the image data by the calling facsimile machine.

If that happens, the MCF signal from the called facsimile machine can not be received at the calling facsimile machine within a lapse of, for example, three seconds from the transmission of the EOP signal as regulated by the communication procedure. In this case, the calling facsimile machine retransmits the EOP signal twice at intervals of three seconds.

If the MCF signal from the called facsimile machine is not received even after two-times retransmission of the EOP signal, the calling facsimile machine judges that a communication failure has occurred, and transmits a DCN (Disconnect) signal for forcibly interrupting the communication.

Since the communication is forcibly interrupted due to an occurrence of the foregoing communication delay, the communication can not be rendered smooth and reliable.

SUMMARY OF THE INVENTION

Therefore, it is an object of the present invention to provide a facsimile machine and a facsimile communication system which can achieve smooth and reliable communication by reducing a possibility of communication errors caused by a communication delay.

It is another object of the present invention to provide a facsimile machine and a facsimile communication system which can reduce a possibility of communication errors caused by a communication delay between gateways.

According to one aspect of the present invention, there is provided a facsimile machine comprising a timing monitor section having a timer for setting a timer value representing a maximum allowable response time for a response signal to be received from a counterpart facsimile machine, the timing monitor section monitoring whether the response signal is received from the counterpart facsimile machine within the timer value; a timer value change information transmitting section which transmits first timer value change information, possessed by the subject facsimile machine, to the counterpart facsimile machine; a timer value change information detecting section which detects second timer value change information transmitted from the counterpart facsimile machine, the second timer value change information selected from the first timer value change information at the counterpart facsimile machine; and a timer value changing section which changes the timer value using the second timer value change information.

According to another aspect of the present invention, there is provided a facsimile machine comprising a timing monitor section having a timer for setting a timer value representing a maximum allowable response time for a response signal to be received from a counterpart facsimile machine, the timing monitor section monitoring whether the response signal is received from the counterpart facsimile machine within the timer value; a timer value change information detecting section which detects timer value change information transmitted from the counterpart facsimile machine, the timer value change information possessed by the counterpart facsimile machine; a timer value change information selecting section which selects, from the timer value change information detected at the timer value change information detecting section, optimum timer value change information to be used in facsimile communication to follow, the optimum timer value change information commonly possessed by the subject facsimile machine; a timer value change information transmitting section which transmits the optimum timer value change information to the counterpart facsimile machine; and a timer value changing section which changes the timer value using the optimum timer value change information.

It may be arranged that the facsimile machine further comprises a communication mode selecting section which selects, upon calling, a communication mode for implementing facsimile communication with the counterpart facsimile machine via a communication network other than a telephone network, wherein the timer value change information detecting section detects the timer value change information only when the communication mode is selected at the communication mode selecting section.

It may be arranged that the facsimile machine further comprises a dial number storage section which stores dial numbers of counterpart facsimile machines to which facsimile communication is to be implemented via the communication network; and a dial number search section which, when a dial number is inputted, searches the dial number storage section for the inputted dial number, wherein the communication mode selecting section selects the communication mode when the inputted dial number is located in the dial number storage section.

It may be arranged that the dial number storage section further stores optimum timer value change information for each of the counterpart facsimile machines such that the dial number and the corresponding optimum timer value change information are mutually retrievable from each other, and that, when the inputted dial number is located in the dial number storage section by the dial number search section, the timer value change information selecting section selects the stored timer value change information corresponding to the located dial number.

According to another aspect of the present invention, there is provided a facsimile communication system comprising a calling facsimile machine; a calling-side gateway connected to the calling facsimile machine via a telephone network; a called-side gateway connected to the calling-side gateway via a communication network other than the telephone network; and a called facsimile machine connected to the called-side gateway via the telephone network, wherein the called facsimile machine comprises a timer for setting a first timer value representing a maximum allowable response time for a response signal to be received from the calling facsimile machine; a called-side timer value change information transmitting section which transmits first timer value change information, possessed by the called facsimile machine, to the called-side gateway; a called-side timer value change information detecting section which detects second timer value change information transmitted from the called-side gateway, the second timer value change information selected from the first timer value change information at the called-side gateway; and a called-side timer value changing section which changes the first timer value using the second timer value change information, wherein the calling-side gateway comprises a called/calling communication delay estimating section which estimates a delay time of a signal transmitted from the called-side gateway to the calling-side gateway; a first calling-side timer value change information detecting section which detects the first timer value change information received from the called-side gateway; a first calling-side timer value change information selecting section which, based on the delay time, selects from the first timer value change information first optimum timer value change information to be used in facsimile communication to follow; and a timer value change information replacing section which replaces the first timer value change information with the first optimum timer value change information so as to transmit the first optimum timer value change information to the calling facsimile machine, and wherein the calling facsimile machine comprises a timer for setting a second timer value representing a maximum allowable response time for a response signal to be received from the called facsimile machine; a second calling-side timer value change information detecting section which detects the first optimum timer value change information received from the calling-side gateway; a second calling-side timer value change information selecting section which selects from the first optimum timer value change information second optimum timer value change information to be used in facsimile communication to follow, the second optimum timer value change information commonly possessed by the calling facsimile machine; a calling-side timer value change information transmitting section which transmits the second optimum timer value change information to the calling-side gateway; and a calling-side timer value changing section which changes the second timer value using the second optimum timer value change information.

According to another aspect of the present invention, there is provided a facsimile communication system comprising a calling facsimile machine; a calling-side gateway connected to the calling facsimile machine via a telephone network; a called-side gateway connected to the calling-side gateway via a communication network other than the telephone network; and a called facsimile machine connected to the called-side gateway via the telephone network, wherein the called facsimile machine comprises a timer for setting a first timer value representing a maximum allowable response time for a response signal to be received from the calling facsimile machine; a called-side timer value change information transmitting section which transmits first timer value change information, possessed by the called facsimile machine, to the called-side gateway; a first called-side timer value change information detecting section which detects second timer value change information transmitted from the called-side gateway, the second timer value change information selected from the first timer value change information at the called-side gateway; and a called-side timer value changing section which changes the first timer value using the second timer value change information, wherein the calling facsimile machine comprises a timer for setting a second timer value representing a maximum allowable response time for a response signal to be received from the called facsimile machine; a calling-side timer value change information detecting section which detects third timer value change information selected from the first timer value change information and received from the calling-side gateway; a calling-side timer value change information selecting section which selects from the third timer value change information first optimum timer value change information to be used in facsimile communication to follow, the first optimum timer value change information commonly possessed by the calling facsimile machine; a calling-side timer value change information transmitting section which transmits the first optimum timer value change information to the calling-side gateway; and a calling-side timer value changing section which changes the second timer value using the first optimum timer value change information, and wherein the called-side gateway comprises a calling/called communication delay estimating section which estimates a delay time of a signal transmitted from the calling-side gateway to the called-side gateway; a second called-side timer value change information detecting section which detects the first timer value change information received from the called facsimile machine; a called-side timer value change information selecting section which, based on the delay time, selects from the first timer value change information second optimum timer value change information to be used in facsimile communication to follow, the second optimum timer value change information selected as the second timer value change information; and a timer value change information replacing section which replaces the first optimum timer value change information received from the calling-side gateway with the second optimum timer value change information so as to transmit the second optimum timer value change information to the called facsimile machine.

According to another aspect of the present invention, there is provided a facsimile communication system comprising a facsimile machine connected to a telephone network; and a gateway connected to the telephone network and another communication network other than the telephone network, wherein the facsimile machine comprises a first timer for setting a first timer value representing a maximum allowable response time for a response signal to be received from a counterpart facsimile machine via the communication network and the gateway relative to a signal transmitted to the counterpart facsimile machine via the gateway and the communication network; and a first flow control section which re-sets the first timer to the first timer value when a re-setting command signal is received from the gateway, the re-setting command signal commanding the first flow control section to re-set the first timer to the first timer value, the first flow control section transmitting to the gateway a re-setting response signal notifying that re-setting of the first timer to the first timer value is finished, and wherein the gateway comprises a second timer for setting a second timer value corresponding to the first timer value, the second timer value representing a maximum allowable response time for the response signal to be received from the counterpart facsimile machine via the communication network relative to the transmitted signal; and a second flow control section which transmits the re-setting command signal to the facsimile machine when the response signal is not received within the second timer value, the second flow control section re-setting the second timer to the second timer value when the re-setting response signal is received from the facsimile machine, the second flow control section repeating transmission of the re-setting command signal and re-setting of the second timer to the second timer value until the response signal is received within the second timer value.

It may be arranged that the second timer value is set to be smaller than the first timer value.

According to another aspect of the present invention, there is provided a facsimile machine comprising a timing monitor section connected to a communication line and having a timer for variably setting a timer value for a response signal relative to a signal transmitted via the communication line, the timing monitor section monitoring whether the response signal is received within the timer value set in the timer; a timer value change information transmitting section which transmits timer value information via the communication line; a timer value change information detecting section which detects timer value information from a received signal via the communication line; and a timer value changing section which changes the timer value of the timer based on the timer value information detected at the timer value change information detecting section.

According to another aspect of the present invention, there is provided a facsimile communication system including a calling facsimile machine and a called facsimile machine connected to said calling facsimile via a communication line, wherein said calling facsimile machine comprises: a timing monitor section having a timer for setting a timer value representing a maximum allowable response time for a response signal to be received from said called facsimile machine, said timing monitor section monitoring whether said response signal is received from said called facsimile machine within said timer value; a timer value change information transmitting section which transmits first timer value change information, possessed by the subject facsimile machine, to said called facsimile machine; a timer value change information detecting section which detects second timer value change information transmitted from said called facsimile machine, said second timer value change information selected from said first timer value change information at said called facsimile machine; and a timer value changing section which changes said timer value using said second timer value change information; and wherein said called facsimile machine comprises: a timing monitor section having a timer for setting a timer value representing a maximum allowable response time for a response signal to be received from said calling facsimile machine, said timing monitor section monitoring whether said response signal is received from said calling facsimile machine within said timer value; a timer value change information detecting section which detects timer value change information transmitted from said calling facsimile machine, said timer value change information possessed by said calling facsimile machine; a timer value change information selecting section which selects, from said timer value change information detected at said timer value change information detecting section, optimum timer value change information to be used in facsimile communication to follow, said optimum timer value change information commonly possessed by the subject facsimile machine; a timer value change information transmitting section which transmits said optimum timer value change information to said calling facsimile machine; and a timer value changing section which changes said timer value using said optimum timer value change information.

It may be arranged that the at least a pair of facsimile machines are directly connected to a packet communication network.

It may be arranged that the timer value change information transmitting section, when working as the called facsimile machine, notifies the calling facsimile machine that the called facsimile machine is directly connected to the packet communication network and can be operated based on a timer value designated by the calling facsimile machine, and that the timer value change information transmitting section, when working as the calling facsimile machine, transmits a maximum timer value for one communication to the called facsimile machine so that an allowable communication time for one communication between the calling and called facsimile machines is regulated by the maximum timer value.

It may be arranged that the maximum timer value is selected based on an estimated communication delay in the packet communication network and an image data amount to be transmitted.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

BRIEF DESCRIPTION OF THE SEVERAL VIEWS OF THE DRAWINGS

The present invention will be understood more fully from the detailed description given hereinbelow, taken in conjunction with the accompanying drawings.

In the drawings.

DETAILED DESCRIPTION OF THE INVENTION

Now, the preferred embodiments of the present invention will be described hereinbelow with reference to the accompanying drawings.

<First Embodiment>

Figure 1:
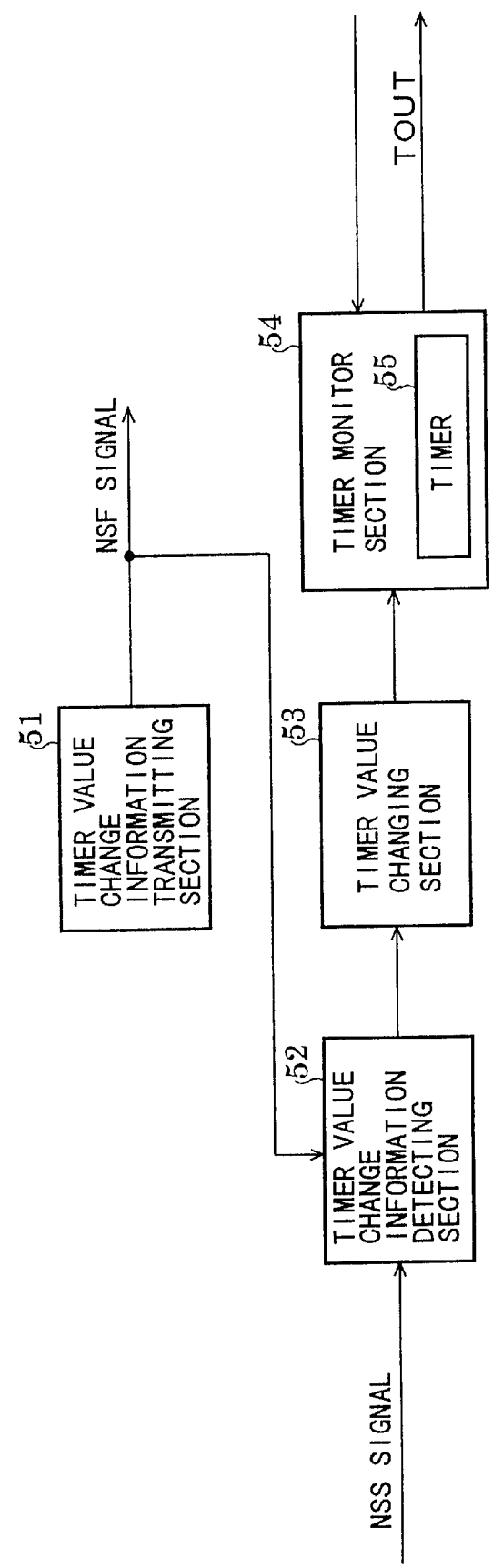
FIG. 1 is a functional block diagram showing the main functions of a facsimile machine, when working as a called facsimile machine (receiver), according to a first preferred embodiment of the present invention.
Figure 2:
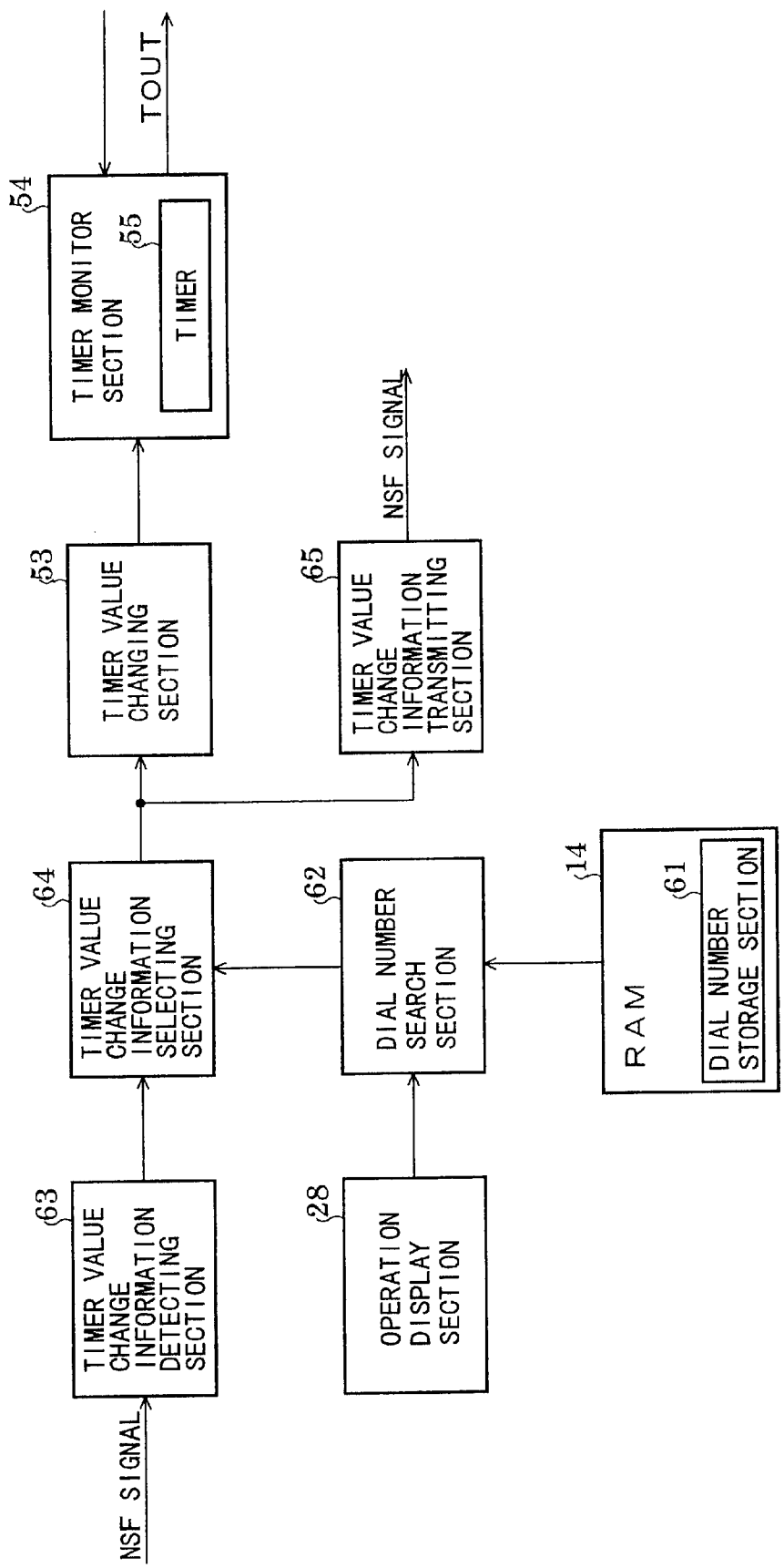
FIG. 2 is a functional block diagram showing the main functions of a facsimile machine, when working as a calling facsimile machine (transmitter), according to the first preferred embodiment of the present invention.
Figure 3:
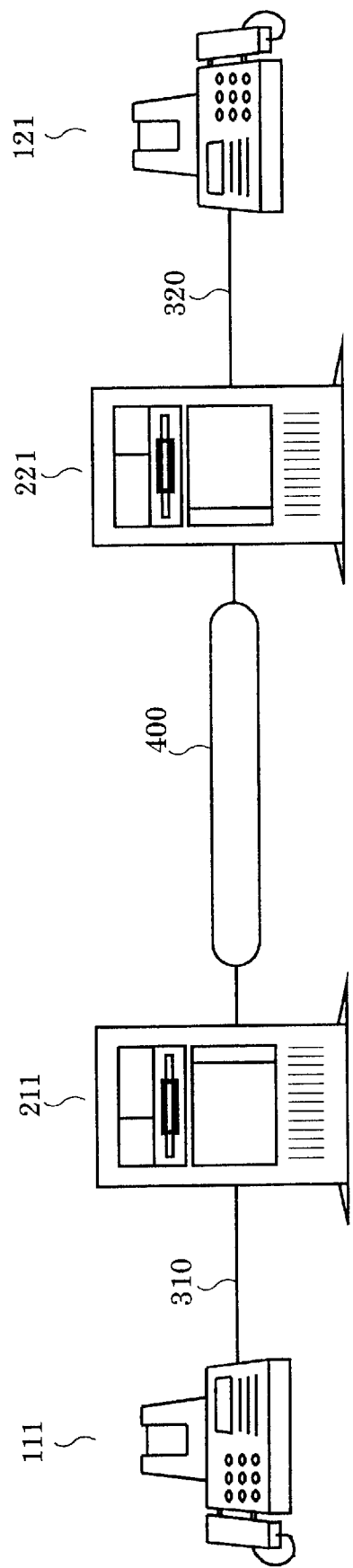
FIG. 3 is a diagram showing a structure of a facsimile communication system according to the first preferred embodiment of the present invention.
Figure 4:
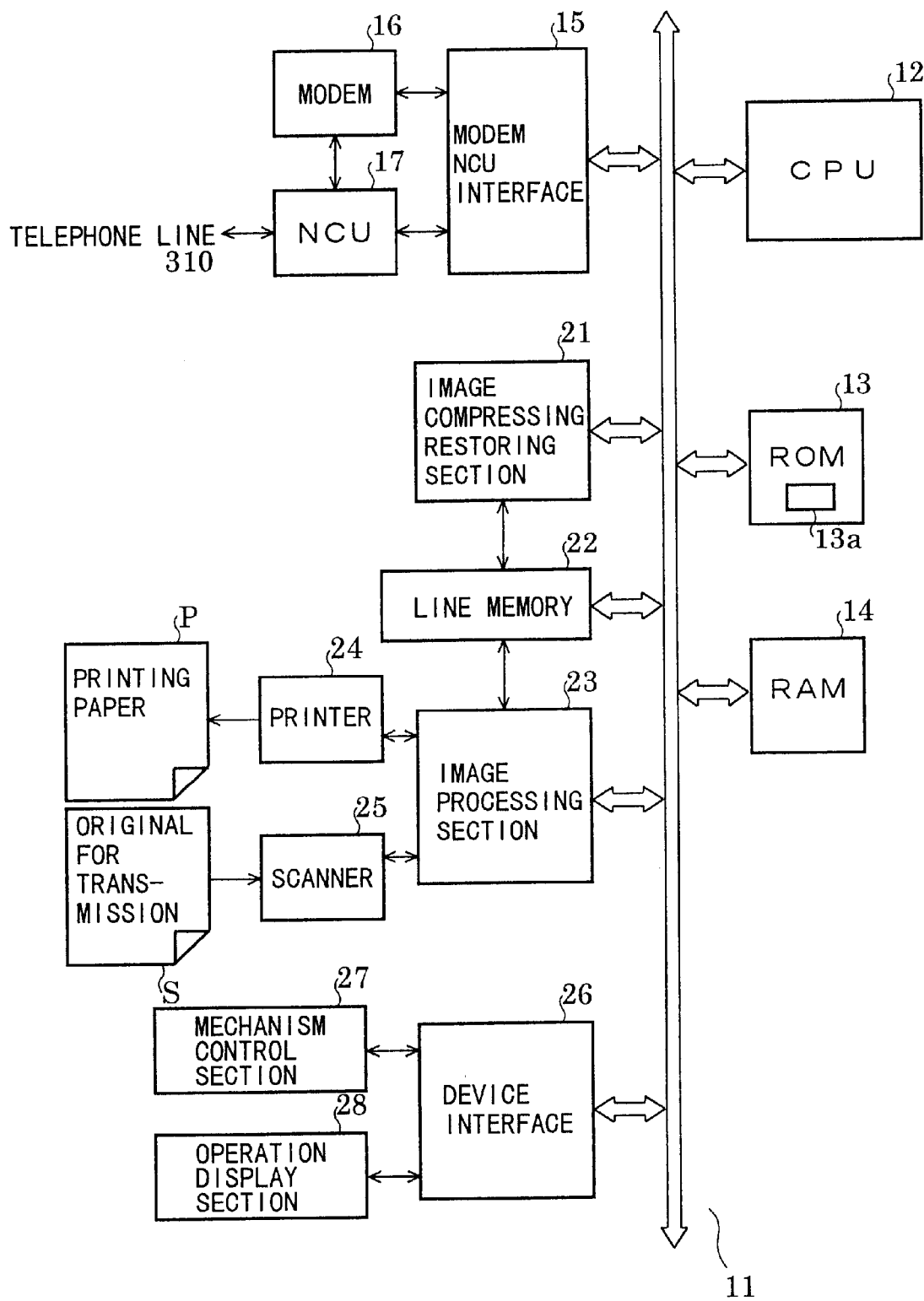
FIG. 4 is a block diagram showing a hardware structure of a facsimile machine according to the first preferred embodiment of the present invention.
Figure 5:
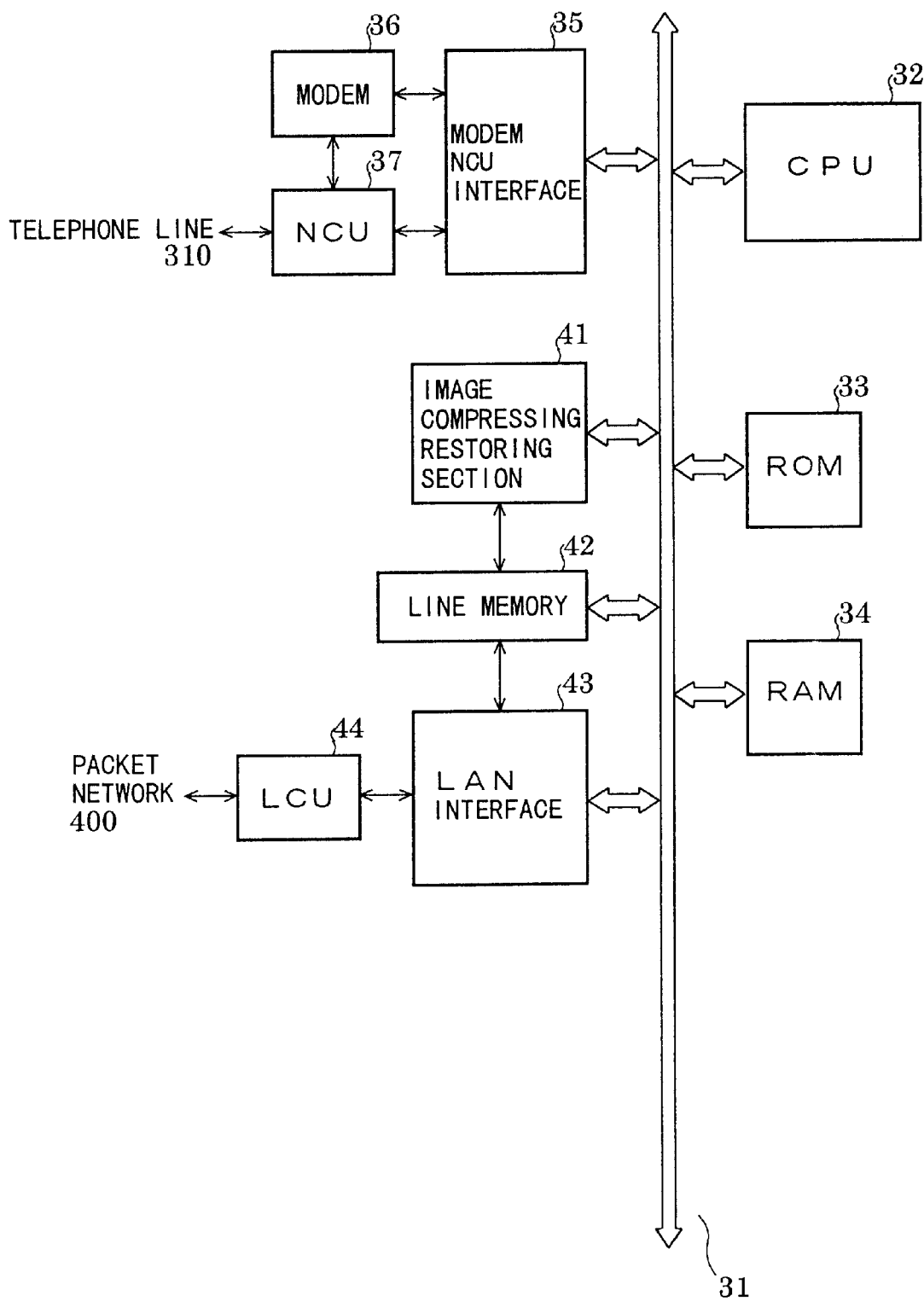
FIG. 5 is a block diagram showing a hardware structure of a gateway according to the first preferred embodiment of the present invention.
Figure 6:
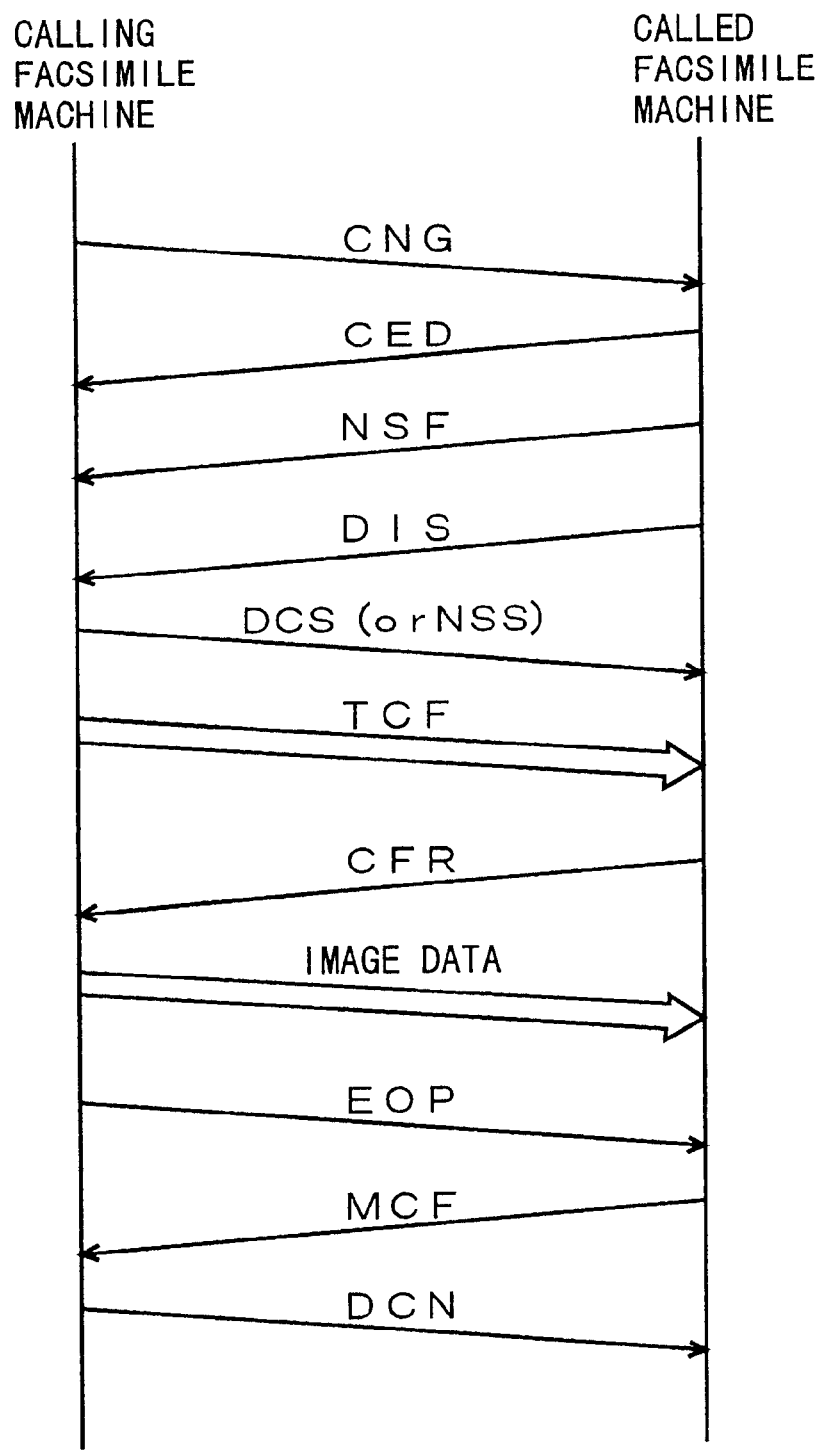
FIG. 6 is a sequence diagram for explaining a facsimile communication procedure between a calling and a called facsimile machine.

FIGS. 1 and 2 are functional block diagrams showing the main functions of a facsimile machine, when working as a called facsimile machine and a calling facsimile machine, respectively, according to the first preferred embodiment of the present invention. FIG. 3 is a diagram showing a structure of a facsimile communication system according to the first preferred embodiment. FIG. 4 is a block diagram showing a hardware structure of the facsimile machine according to the first preferred embodiment. FIG. 5 is a block diagram showing a hardware structure of a gateway according to the first preferred embodiment. FIG. 6 is a sequence diagram for explaining a facsimile communication procedure between a calling and a called facsimile machine.

As shown in FIG. 3, a facsimile machine 111 is connected to a gateway 211 via a telephone line 310. The gateway 211 is connected to a packet communication network 400. On the other hand, a facsimile machine 121 is connected to a gateway 221 via a telephone line 320. The gateway 221 is connected to the packet communication network 400. The packet communication network 400 is constituted by the Internet, for example.

Facsimile communication between the facsimile machine 111 and the facsimile machine 121 is carried out via the packet communication network 400.

Between the facsimile machine 111 and the gateway 211 and between the facsimile machine 121 and the gateway 221, facsimile communication is carried out pursuant to the communication procedure regulated by the ITU-T Recommendation T. 30. On the other hand, between the gateway 211 and the gateway 221, facsimile communication is carried out pursuant to the communication procedure regulated by the ITU-T Recommendation T. 38.

The facsimile machines 111 and 121 have mutually the same structure, and the gateways 211 and 221 also have mutually the same structure. Accordingly, the facsimile machine 111 and the gateway 211 will be described hereinbelow.

FIG. 4 is a block diagram showing a hardware structure of the facsimile machine 111 shown in FIG. 3.

In FIG. 4, a CPU 12 controls the whole of the machine and thus has a function of wholly dealing with a control of the flow of image data, a communication control, a network control and so on. The CPU 12 is connected via a bus 11 to a ROM 13, a RAM 14, a modem NCU interface 15, an image compressing restoring section 21, a line memory 22, an image processing section 23 and a device interface 26.

The ROM 13 stores control programs to be executed by the CPU 12 and control data to be used in the execution of the control programs. Specifically, the ROM 13 stores a control program and control data for carrying out the facsimile communication procedure. The ROM 13 further stores a later-described timer value change control program for changing timer values regulated by the ITU-T Recommendation T. 30. The timer values are each used for monitoring whether a signal from a counterpart facsimile machine is received within a given response time, so as to confirm whether facsimile communication is executed normally or not. The ROM 13 further stores a program for selecting a communication mode. Accordingly, in FIG. 4, the ROM 13 is shown as having a communication mode selecting section 13a.

The RAM 14 temporarily stores image data which is to be transmitted to or has been received from a counterpart facsimile machine, and thus has a function of a transmission-reception buffer for image data.

To the modem NCU interface 15 are connected a modem 16 and an NCU (Network Control Unit) 17. The modem 16 modulates a transmitting signal and demodulates a received signal so as to support functions pursuant to the ITU-T Recommendation V. 17, the ITU-T Recommendation V. 34 and the like. The NCU 17 is connected to the telephone line 310 and controls connection and disconnection relative to a counterpart facsimile machine.

The image compressing restoring section 21 compresses image data to be transmitted based on MH (Modified Huffman) coding, MR (Modified READ) coding, MMR (Modified Modified READ) coding or the like, while decompresses received compressed image data to restore the original image data. The line memory 22 temporarily stores image data which is to be transmitted to or has been received from a counterpart facsimile machine.

To the image processing section 23 are connected a printer 24 and a scanner 25. The image processing section 23 performs given image processing on image data to be outputted to the printer 24 or image data inputted from the scanner 25.

To the device interface 26 are connected a mechanism control section 27 and an operation display section 28. The mechanism control section 27 comprises drivers for operating corresponding components of the machine, and sensors. The operation display section 28 is used for inputting operation data and setting data and for displaying such inputted data and information about the state of the machine. The operation display section 28 includes operation keys for dialing and doing others, a liquid-crystal panel, LED's (Light Emitting Diodes) and so on.

When transmitting image data, a user first sets an original sheet S and carries out a required operation for transmission using the operation display section 28. Then, the scanner 25 reads an image of the original sheet S and converts it into image data. The image data is then subjected to the given image processing at the image processing section 23 and once stored in the line memory 22. Subsequently, the image data is read out from the line memory 22 and compressed at the image compressing restoring section 21, and then stored in the RAM 14, working as a transmission buffer, via the bus 11. Subsequently, the image data is read out from the RAM 14 and transferred to the modem NCU interface 15 via the bus 11. Subsequently, the image data is transferred to the modem 16 where it is modulated, and then sent out onto the telephone line 310 via the NCU 17.

On the other hand, when image data is received at the NCU 17 from the telephone line 310, the received image data is demodulated at the modem 16. Then, the image data is outputted onto the bus 11 via the modem NCU interface 15 and stored in the RAM 14 working as a reception buffer. Subsequently, the image data is read out from the RAM 14 and transferred to the image compressing restoring section 21 via the bus 11. The image data is decompressed so as to be restored as the original image data at the image compressing restoring section 21, and then transferred to the image processing section 23 via the line memory 22. Subsequently, the image data is subjected to the given image processing at the image processing section 23 and then transferred to the printer 24. In the printer 24, the image is printed on a paper sheet P based on the transferred image data.

Communication between the facsimile machines 111 and 121 is implemented based on control signals exchanged therebetween before transmission of image data. A control signal is read out from the ROM 13 by the CPU 12 and transferred to the modem NCU interface 15 via the bus 11. Subsequently, the control signal is transferred to the modem 16 where it is modulated, and then sent out onto the telephone line 310 via the NCU 17.

On the other hand, when a control signal is received at the NCU 17 from the telephone line 310, the control signal is outputted onto the bus 11 via the modem NCU interface 15 and transferred to the CPU 12. The CPU 12 analyzes the control signal and implements a communication procedure according to the analyzed contents. Image data received after an exchange of the control signals is demodulated at the modem 16.

FIG. 5 is a block diagram showing a hardware structure of the gateway 211 shown in FIG. 3.

In FIG. 5, a CPU 32 controls the whole of the gateway and thus has a function of wholly dealing with a control of the flow of image data, a communication control, a network control and so on. The CPU 32 is connected via a bus 31 to a ROM 33, a RAM 34, a modem NCU interface 35, an image compressing restoring section 41, a line memory 42 and a LAN interface 43.

The ROM 33 stores control programs to be executed by the CPU 32 and control data to be used in the execution of the control programs, including control programs and control data for carrying out the facsimile communication procedures. The RAM 34 temporarily stores image data which is to be transmitted or has been received, and thus has a function of a transmission-reception buffer for image data.

To the modem NCU interface 35 are connected a modem 36 and an NCU (Network Control Unit) 37. The modem 36 modulates a transmitting signal and demodulates a received signal so as to support functions pursuant to the ITU-T Recommendation V. 17, the ITU-T Recommendation V. 34 and the like. The NCU 37 is connected to the telephone line 310 and controls connection and disconnection relative to an associated facsimile machine.

For checking an error of image data received via the telephone line 310 or the packet communication network 400, the image compressing restoring section 41 decompresses the received image data to restore the original image data. When image data compression modes of a calling and a called facsimile machine differ from each other, the image compressing restoring section 41 restores the original image data from the received image data and then compresses the restored image data according to the image data compression mode of the called facsimile machine. The line memory 42 temporarily stores image data which is to be transmitted or has been received.

To the LAN interface 43 is connected an LCU (Line Control Unit) 44 which is connected to the packet communication network 400. The LAN interface 43 divides into packets a control signal or image data received via the telephone line 310 and reconstructs a control signal or image data from packets received via the packet communication network 400. The LCU 44 controls connection and disconnection relative to a counterpart gateway.

Image data received via the telephone line 310 is transmitted to the packet communication network 400 in the following manner: When image data is received at the NCU 37 from the telephone line 310, the received image data is demodulated at the modem 36. Then, the image data is outputted onto the bus 31 via the modem NCU interface 35 and stored in the RAM 34 working as a transmission-reception buffer.

Subsequently, the image data is read out from the RAM 34 and transferred to the image compressing restoring section 41 via the bus 31. The image data is decompressed so as to be restored as the original image data at the image compressing restoring section 41. The restored image data is used only for checking an error thereof.

If no error is found, the image data is read out from the RAM 34 and transferred to the LAN interface 43. The image data is divided into packets at the LAN interface 43 and transmitted to the packet communication network 400 via the LCU 44.

On the other hand, image data received via the packet communication network 400 is transmitted via the telephone line 310 in the following manner: When packets are received at the LCU 44 from the packet communication network 400, the received packets are reconstructed into image data at the LAN interface 43. The reconstructed image data is stored in the RAM 34 working as a transmission-reception buffer.

Subsequently, the image data is read out from the RAM 34 and decompressed so as to be restored as the original image data at the image compressing restoring section 41. The restored image data is used only for checking an error thereof.

If no error is found, the image data is read out again from the RAM 34 and transferred to the modem NCU interface 35 via the bus 31. The transferred image data is modulated at the modem 36 and sent out onto the telephone line 310 via the NCU 37.

FIG. 6 is a sequence diagram for explaining a facsimile communication procedure between a calling and a called facsimile machine.

When a CNG (Calling Tone) signal is sent from the calling facsimile machine, the called facsimile machine closes the line and transmits a CED (Called Station Identification) signal, an NSF (Non-Standard Facilities) signal and a DIS (Digital Identification Signal) in order.

Then, the calling facsimile machine transmits a DCS (Digital Command Signal) or an NSS (Non-Standard Facilities Set-up) signal.

Subsequently, the calling facsimile machine transmits a TCF (Training Check) signal.

When the TCF signal is normally received, the called facsimile machine transmits a CFR (Confirmation to Receive) signal.

In response to receipt of the CFR signal, i.e. after an exchange of the given control signals, the calling facsimile machine starts transmission of image data. Following the termination of the image data transmission, the calling facsimile machine transmits an EOP (End of Procedure) signal.

In response to receipt of the EOP signal, the called facsimile machine transmits an MCF (Message Confirmation) signal.

In response to receipt of the MCF signal, the calling facsimile machine transmits a DCN (Disconnect) signal so that the line is disconnected.

For confirming whether the facsimile communication is normally implemented, each of the facsimile machines monitors whether a given signal is received from the counterpart facsimile machine within a normal response time.

For example, upon transmitting the TCF signal, the calling facsimile machine sets a T4 timer value (3 seconds). Then, unless the CFR signal is received within 3 seconds from the called facsimile machine, the calling facsimile machine judges that a transmission failure has occurred, and retransmits the DCS or NSS signal and then the TCF signal.

On the other hand, upon transmitting the CFR signal, the called facsimile machine sets a T2 timer value (6 seconds). Then, unless image data is received within 6 seconds from the calling facsimile machine, the called facsimile machine judges that a transmission failure has occurred, and forcibly interrupts the communication.

The foregoing timer values each represent the normal maximum response time and are regulated in the ITU-T Recommendation T. 30.

As described before, the ROM 13 of the facsimile machine 111 stores the timer value change control program for changing the timer values regulated in the ITU-T Recommendation T. 30 by mutual agreement with a counterpart facsimile machine.

For achieving such an agreement, the NSF signal and the NSS signal exchanged in the facsimile communication procedure are used. The NSF signal includes all timer value change information possessed by the subject facsimile machine (the machine which transmits the NSF signal). The NSS signal includes timer value change information to be used in facsimile communication to follow (to be implemented subsequently).

The timer value change information is, for example, information for increasing a timer value of the ITU-T Recommendation T. 30 "twofold".

The NSF signal is a signal for notifying a counterpart facsimile machine of all non-standard communication capabilities possessed by the subject facsimile machine (the machine which transmits the NSF signal). The NSS signal is a signal for selecting the optimum communication capability for use in facsimile communication to follow, from communication capabilities possessed by the subject facsimile machine (the machine which transmits the NSS signal) within the range of the communication capabilities included in the NSF signal, so as to notify the selected communication capability to a counterpart facsimile machine.

FIGS. 1 and 2 show called-side and calling-side functional blocks realized by executing the timer value change control program stored in the ROM 13 of the facsimile machine, respectively.

Specifically, FIG. 1 shows the called-side functional blocks for transmitting to a calling facsimile machine an NSF signal including all timer value change information (communication capabilities) possessed by the subject facsimile machine and receiving an NSS signal from the calling facsimile machine. FIG. 2 shows the calling-side functional blocks for receiving an NSF signal from a called facsimile machine and transmitting to the called facsimile machine an NSS signal including selected timer value change information (communication capability).

In FIG. 1, a timer value change information transmitting section 51 transmits all timer value change information possessed by a called facsimile machine as an NSF signal. The timer value change information transmitting section 51 has a function of transmitting, for example, three kinds of timer value change information for increasing a timer value "twofold", "threefold" and "fourfold", respectively. Hereinafter, these three kinds of timer value change information will be referred to as timer value change information of "twofold", timer value change information of "threefold" and timer value change information of "fourfold", respectively.

A timer value change information detecting section 52 has a function of detecting timer value change information included in an NSS signal received from a calling facsimile machine. This timer value change information has been selected by the calling facsimile machine as the optimum timer value change information for use in facsimile communication to follow, from timer value change information possessed by the calling facsimile machine within the range of the timer value change information of the given kinds transmitted by the foregoing timer value change information transmitting section 51.

A timer value changing section 53 has a function of holding the timer values of the ITU-T Recommendation T. 30. The timer value changing section 53 has a further function of outputting to a timing monitor section 54 the corresponding timer value of the ITU-T Recommendation T. 30 as it is when the timer value change information is not detected at the timer value change information detecting section 52. The timer value changing section 53 has a further function of, when the timer value change information is detected at the detecting section 52, changing the corresponding timer value based on the detected timer value change information and outputting the changed timer value to the timing monitor section 54.

For example, when the timer value change information of "twofold" is detected at the timer value change information detecting section 52, the T2 timer value is changed to 12 seconds. In this case, the T4 timer value is changed to 6 seconds in the calling facsimile machine.

The timing monitor section 54 has a function of monitoring whether a response signal from the calling facsimile machine is received within a normal response time. Specifically, the timing monitor section 54 holds the timer value outputted from the timer value changing section 53 and sets it in a timer 55 at a given timing. Unless the response signal is received within a time represented by the timer value set in the timer 55, the timing monitor section 54 outputs a time-out signal TOUT indicative of it.

In FIG. 2 showing the calling side, the RAM 14 has a dial number storage section 61. The dial number storage section 61 stores a dial number of each of counterpart facsimile machines to which facsimile communication is implemented via the packet communication network 400, and the optimum timer value change information for the corresponding counterpart facsimile machine, such that the dial number and the corresponding optimum timer value change information are mutually retrievable from each other.

A dial number search section 62 has a function of, when a dial number of a counterpart facsimile machine is inputted via the operation display section 28 for making a call, searching the dial number storage section 61 for the inputted dial number. The dial number search section 62 has a further function of, when the inputted dial number is located in the dial number storage section 61, reading out timer value change information stored corresponding to the located dial number and outputting it to a timer value change information selecting section 64.

A timer value change information detecting section 63 has a function of detecting timer value change information included in an NSF signal received from a called facsimile machine. The NSF signal includes all timer value change information possessed by the called facsimile machine.

The timer value change information selecting section 64 has a function of selecting the optimum timer value change information for use in facsimile communication to follow, from timer value change information possessed by the subject facsimile machine within the range of the timer value change information detected at the timer value change information detecting section 63. The selecting section 64 has a further function of, when the timer value change information is inputted from the dial number search section 62, selecting the inputted timer value change information as the optimum timer value change information. The selecting section 64 has a further function of outputting the selected timer value change information to a timer value changing section 53 and a timer value change information transmitting section 65.

The timer value change information transmitting section 65 has a function of transmitting the timer value change information selected at the timer value change information selecting section 64 as an NSS signal.

Figure 7:
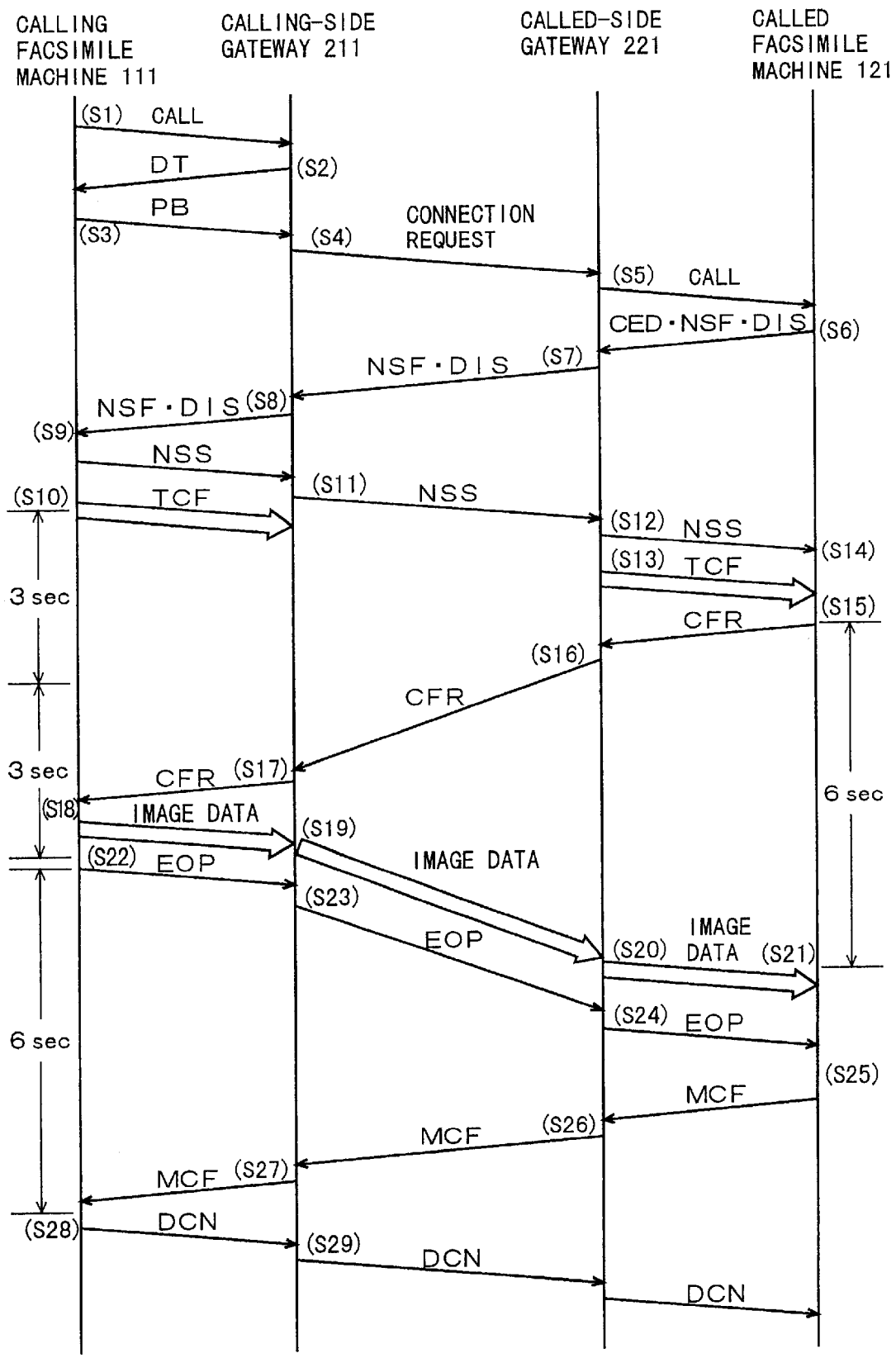
FIG. 7 is a diagram showing a facsimile communication operation sequence according to the first preferred embodiment of the present invention.

FIG. 7 is a diagram showing a facsimile communication operation sequence according to the first preferred embodiment of the present invention.

It is assumed that the facsimile machine 111 is a calling facsimile machine working as a transmitter for transmitting image data, while the facsimile machine 121 is a called facsimile machine working as a receiver for receiving image data.

First, the facsimile machine 111 is inputted with a dial number of the facsimile machine 121 for making a call thereto. Then, the dial number search section 62 searches the dial number storage section 61 to locate the inputted dial number, and outputs timer value change information of, for example, "twofold" corresponding to the located dial number to the timer value change information selecting section 64. In response to this output, the communication mode selecting section 13a of the facsimile machine 111 selects a communication mode for implementing facsimile communication via the packet communication network 400. Then, a call is made to the gateway 211 (step S1).

In response to the call from the facsimile machine 111 to the gateway 211, the line is established therebetween. Then, a dial tone DT is transmitted from the gateway 211 to the facsimile machine 111 (step S2). In response to receipt of the dial tone DT from the gateway 211, the facsimile machine 111 transmits the dial number (PB signal) of the facsimile machine 121 to the gateway 211 (step S3).

In response to receipt of the PB signal, the gateway 211 retrieves an IP address of the gateway 221 in the packet communication network 400 from addresses stored in the RAM 34, and transmits to the gateway 221 a connection request adding the dial number of the facsimile machine 121 (step S4).

In response to receipt of the connection request from the gateway 211, the gateway 221 makes a call to the facsimile machine 121 (step S5).

In response to the call from the gateway 221 to the facsimile machine 121, the line is established therebetween. Then, the facsimile machine 121 transmits to the gateway 221 a CED signal, an NSF signal and a DIS in order. The NSF signal transmitted from the timer value change information transmitting section 51 of the facsimile machine 121 includes three kinds of timer value change information of "twofold", "threefold" and "fourfold" which are possessed by the facsimile machine 121 (step S6).

The gateway 221 divides the NSF signal and the DIS received from the facsimile machine 121 into packets and transmits the packets to the gateway 211 (step S7).

The gateway 211 reconstructs the NSF signal and the DIS from the received packets and transmits them to the facsimile machine 111 (step S8).

When the NSF signal and the DIS are received at the facsimile machine 111, the timer value change information detecting section 63 detects the foregoing timer value change information included in the NSF signal. Specifically, the timer value change information of "twofold", the timer value change information of "threefold" and the timer value change information of "fourfold" are detected. Then, the timer value change information selecting section 64 selects the timer value change information of "twofold" according to the output from the dial number search section 62. In response to this selection, the timer value changing section 53 increases the timer value twofold. Simultaneously, the timer value change information transmitting section 65 transmits the timer value change information of "twofold" to the gateway 211 as an NSS signal (step S9).

Subsequently, the facsimile machine 111 transmits a TCF signal to the gateway 211. Simultaneously, at the timing monitor section 54 of the facsimile machine 111, a twofold-increased T4 timer value (6 seconds) is set in the timer 55 (step S10).

The gateway 211 divides the NSS signal received from the facsimile machine 111 into packets and transmits the packets to the gateway 221, and then goes into a standby state awaiting receipt of the TCF signal from the facsimile machine 111. When the gateway 211 normally receives the TCF signal from the facsimile machine, the gateway 211 goes into a standby state awaiting receipt of a CFR signal from the gateway 221 (step S11).

The gateway 221 reconstructs the NSS signal from the received packets and transmits it to the facsimile machine 121 (step S12). Then, the gateway 221 produces a TCF signal according to a modem mode set by the NSS signal and transmits it to the facsimile machine 121 (step S13).

When the NSS signal is received at the facsimile machine 121, the timer value change information detecting section 52 thereof detects the timer value change information of "twofold" included in the NSS signal. Then, the timer value changing section 53 increases the timer value twofold (step S14).

In response to receipt of the TCF signal, the facsimile machine 121 transmits a CFR signal to the gateway 221. Simultaneously, at the timing monitor section 54 of the facsimile machine 121, a twofold-increased T2 timer value (12 seconds) is set in the timer 55 (step S15).

When the CFR signal is received from the facsimile machine 121, the gateway 221 divides the received CFR signal into packets and transmits the packets to the gateway 211. At this time, if a large communication delay occurs in the packet communication network 400, the packets (CFR signal) reach the gateway 211 with a corresponding delay (step S16).

The gateway 211 reconstructs the CFR signal from the packets received from the gateway 221 and transmits the CFR signal to the facsimile machine 111 (step S17).

The facsimile machine 111 receives the CFR signal from the gateway 211. If the normal T4 timer value (3 seconds) is set in the timer 55 at step S10, since more than 3 seconds have elapsed after the transmission of the TCF signal in an example of FIG. 7, it is necessary that the facsimile machine 111 retransmits the NSS signal and the TCF signal. However, in the example of FIG. 7, the twofold-increased T4 timer value of 6 seconds is set at step S10 and further the CFR signal is received within a lapse of 6 seconds, although after a lapse of 3 seconds, from the transmission of the TCF signal. Accordingly, the facsimile machine 111 recognizes that the CFR signal is received within the normal response time. Thus, the retransmission of the NSS signal and the TCF signal, which would be otherwise required due to the delay of the CFR signal relative to the TCF signal caused by the foregoing communication delay from the gateway 221 to the gateway 211, is not required so that the delay of the CFR signal relative to the TCF signal can be absorbed.

In response to receipt of the CFR signal from the gateway 211, the facsimile machine 111 transmits image data to the gateway 211 (step S18).

The gateway 211 divides the image data received from the facsimile machine 111 into packets and transmits the packets to the gateway 221. At this time, if a large communication delay is caused in the packet communication network 400, the packets (image data) reach the gateway 221 with a corresponding delay (step S19).

The gateway 221 reconstructs the image data from the packets received from the gateway 211 and transmits the image data to the facsimile machine 121 (step S20).

The facsimile machine 121 receives the image data from the gateway 221. If the normal T2 timer value (6 seconds) is set in the timer 55 at step S15, since more than 6 seconds have elapsed after the transmission of the CFR signal in the example of FIG. 7, the facsimile machine 121 interrupts the reception process. However, in the example of FIG. 7, the twofold-increased T2 timer value of 12 seconds is set at step S15 and further the image data is received within a lapse of 12 seconds, although after a lapse of 6 seconds, from the transmission of the CFR signal. Accordingly, the facsimile machine 121 recognizes that the image data is received within the normal response time. Thus, the delay of the image data relative to the CFR signal caused by the communication delay from the gateway 211 to the gateway 221 can be absorbed like the delay of the CFR signal relative to the TCF signal (step S21).

After the transmission of the image data, the facsimile machine 111 transmits an EOP signal to the gateway 211. Simultaneously, the timing monitor section 54 of the facsimile machine 111 sets a twofold-increased T4 timer value (6 seconds) in the timer 55 (step S22).

The gateway 211 divides the EOP signal received from the facsimile machine 111 into packets and transmits the packets to the gateway 221. At this time, transmission of the packets (EOP signal) is delayed following the transmission delay of the image data (step S23).

The gateway 221 reconstructs the EOP signal from the packets received from the gateway 211 and transmits the EOP signal to the facsimile machine 121 (step S24).

In response to receipt of the EOP signal from the gateway 221, the facsimile machine 121 transmits an MCF signal to the gateway 221 (step S25).

The gateway 221 divides the received MCF signal into packets and transmits the packets to the gateway 211 (step S26).

The gateway 211 reconstructs the MCF signal from the received packets and transmits the MCF signal to the facsimile machine 111 (step S27).

The facsimile machine 111 receives the MCF signal from the gateway 211. If the normal T4 timer value (3 seconds) is set in the timer 55 at step S22, since more than 3 seconds have elapsed after the transmission of the EOP signal in the example of FIG. 7, it is necessary that the facsimile machine 111 retransmits the EOP signal. However, in the example of FIG. 7, the twofold-increased T4 timer value of 6 seconds is set at step S22 and further the MCF signal is received within a lapse of 6 seconds, although after a lapse of 3 seconds, from the transmission of the EOP signal. Accordingly, the facsimile machine 111 recognizes that the MCF signal is received within the normal response time. Thus, the delay of the MCF signal relative to the EOP signal caused by the communication delay from the gateway 221 to the gateway 211 can be absorbed like the delay of the CFR signal or the image data.

In response to receipt of the MCF signal, the facsimile machine 111 transmits a DCN signal to the gateway 211 so that the line between the facsimile machine 111 and the gateway 211 is disconnected (step S28).

The DCN signal is transmitted to the facsimile machine 121 via the gateways 211 and 221 to finally disconnect the line between the facsimile machine 121 and the gateway 221, so that the communication between the facsimile machines 111 and 121 is terminated (step S29).

As described above, according to the first preferred embodiment of the present invention, the timer value change information transmitting section 51 of the called facsimile machine 121 notifies all timer value change information possessed by the subject facsimile machine 121 to the calling facsimile machine 111 as the NSF signal.

Then, the timer value change information detecting section 63 of the facsimile machine 111 detects the timer value change information included in the NSF signal. Subsequently, the timer value change information selecting section 64 selects the optimum timer value change information, also possessed by the subject facsimile machine 111, from the detected timer value change information. Then, the timer value changing section 53 of the facsimile machine 111 changes the timer value based on the selected timer value change information. On the other hand, the timer value change information transmitting section 65 notifies the selected timer value change information to the called facsimile machine 121 as the NSS signal.

Then, the timer value change information detecting section 52 of the called facsimile machine 121 detects the timer value change information included in the received NSS signal. Subsequently, the timer value changing section 53 of the facsimile machine 121 changes the timer value based on the detected timer value change information.

Thereafter, the facsimile machines 111 and 121 execute subsequent facsimile communication using the commonly changed timer values, respectively.

Accordingly, the influence of a communication delay in the packet communication network 400 between the gateways 211 and 221 can be absorbed between the facsimile machines 111 and 121. Therefore, a possibility of communication errors caused by such a communication delay can be reduced to realize the highly reliable facsimile communication.

Further, the dial number storage section 61 stores a dial number of each of counterpart facsimile machines to which facsimile communication is implemented via the packet communication network 400. When a dial number of a counterpart facsimile machine is inputted for making a call, the dial number search section 62 searches the dial number storage section 61 for the inputted dial number.

Thus, it is possible to judge upon making a call whether to communicate via the packet communication network 400. Accordingly, it may be arranged to detect the timer value change information from the NSF signal only when it is judged to communicate via the packet communication network 400.

It may be arranged that the operation display section 28 is provided with an operation key for selecting a communication mode implemented via the packet communication network 400. By using this operation key, the communication mode via the packet communication network 400 can be selected upon inputting a dial number. With this arrangement, even if an inputted dial number is not stored in the dial number storage section 61, whether to communicate via the packet communication network 400 can be judged upon making a call.

Further, the dial number storage section 61 stores a dial number of each of counterpart facsimile machines and the optimum timer value change information for the corresponding counterpart facsimile machine, such that the dial number and the corresponding optimum timer value change information are mutually retrievable from each other. With this arrangement, when an inputted dial number is located in the dial number storage section 61 by the dial number search section 62, the timer value change information corresponding to the located dial number is directly selected by the timer value change information selecting section 64 as the optimum timer value change information.

Therefore, the optimum timer value change information corresponding to the counterpart facsimile machine can be selected easily and reliably.

<Second Embodiment>

Figure 8:
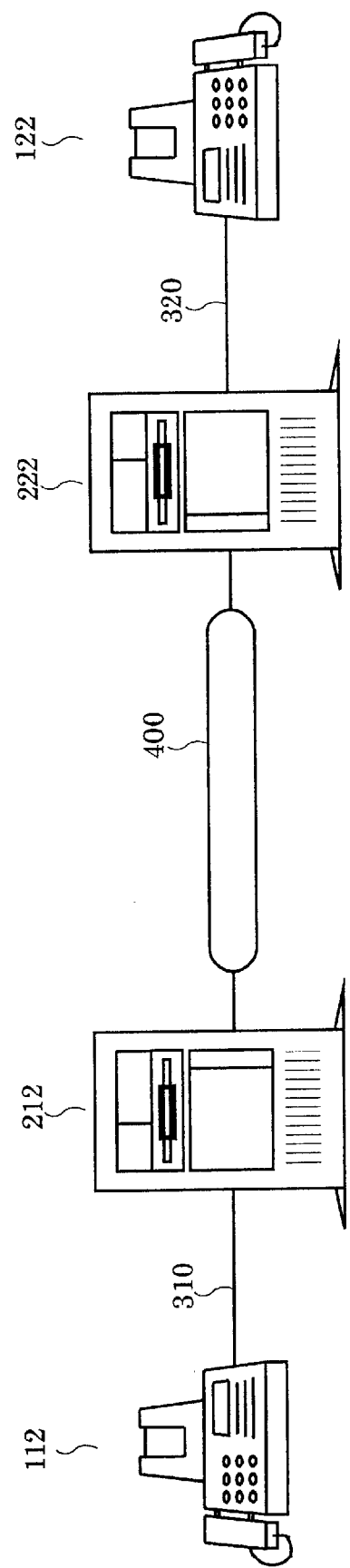
FIG. 8 is a diagram showing a structure of a facsimile communication system according to a second preferred embodiment of the present invention.

FIG. 8 is a diagram showing a structure of a facsimile communication system according to the second preferred embodiment of the present invention.

As shown in FIG. 8, a facsimile machine 112 is connected to a gateway 212 via a telephone line 310. The gateway 212 is connected to a packet communication network 400. On the other hand, a facsimile machine 122 is connected to a gateway 222 via a telephone line 320. The gateway 222 is connected to the packet communication network 400.

Facsimile communication between the facsimile machine 112 and the facsimile machine 122 is carried out via the packet communication network 400.

The facsimile machines 112 and 122 have mutually the same structure, and the gateways 212 and 222 also have mutually the same structure. Accordingly, the facsimile machine 112 and the gateway 212 will be described hereinbelow.

The facsimile machine 112 is the same in hardware structure as the facsimile machine 111 shown in FIG. 4, but does not have either of the dial number storage section 61 and the dial number search section 62 shown in FIG. 2.

The gateway 212 is the same in hardware structure as the gateway 211 shown in FIG. 5, but a ROM 33 thereof stores a timer value change control program for changing timer values of the facsimile machine 112 connected thereto via the telephone line 310.

Figure 9:
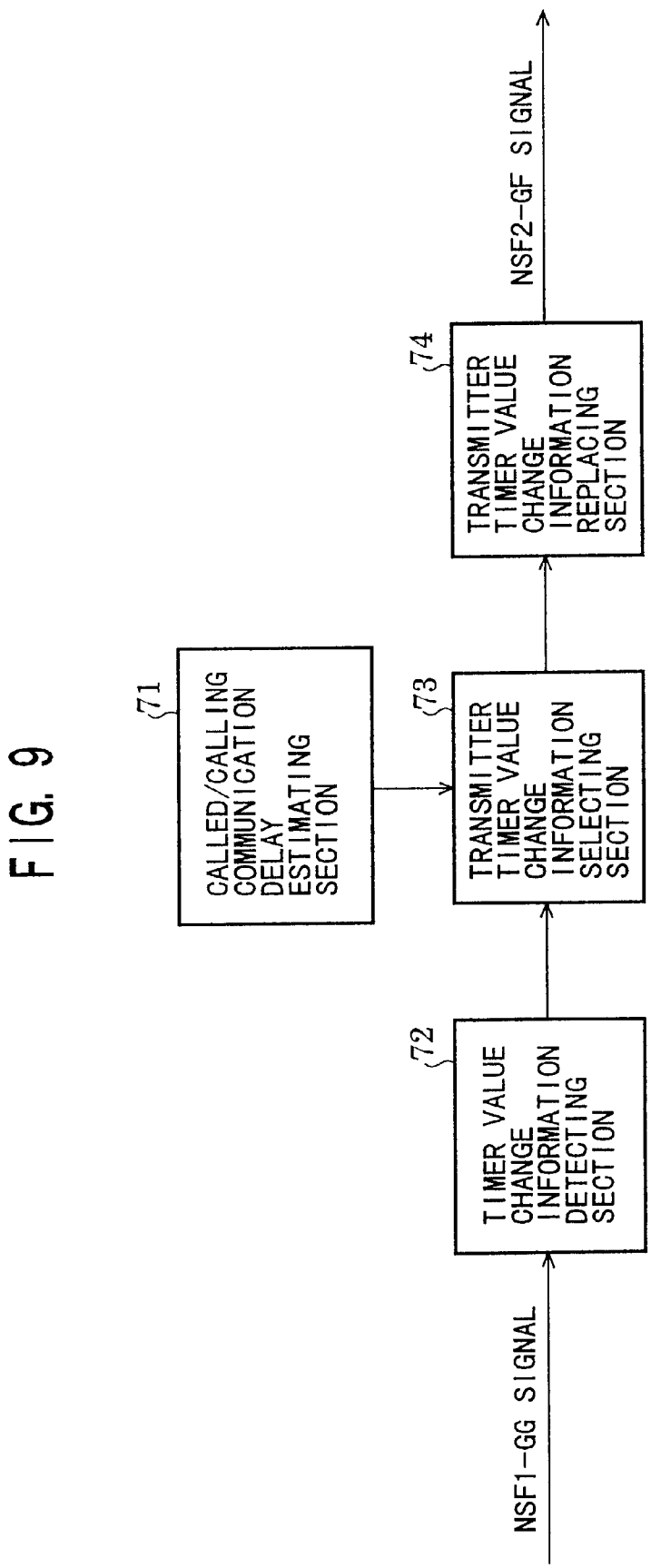
FIG. 9 is a functional block diagram showing the main functions of a gateway, when working as a calling-side gateway, according to the second preferred embodiment of the present invention.
Figure 10:
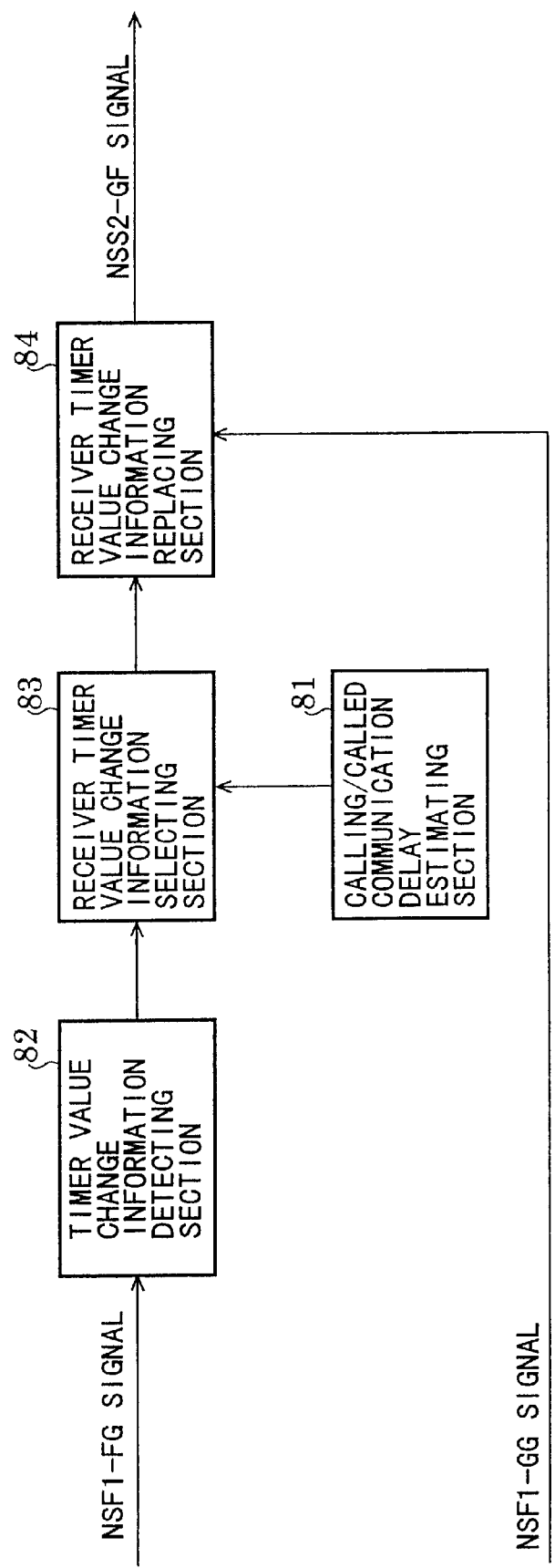
FIG. 10 is a functional block diagram showing the main functions of a gateway, when working as a called-side gateway, according to the second preferred embodiment of the present invention.

FIGS. 9 and 10 show calling-side and called-side functional blocks realized by executing the timer value change control program stored in the ROM 33, respectively.

Specifically, FIG. 9 shows the calling-side functional blocks produced in a calling-side gateway which receives via a called-side gateway an NSF signal transmitted from a called facsimile machine and which receives an NSS signal transmitted from a calling facsimile machine. FIG. 10 shows the called-side functional blocks produced in a called-side gateway which receives an NSF signal transmitted from a called facsimile machine and which receives via a calling-side gateway an NSS signal transmitted from a calling facsimile machine.

Assuming that the facsimile machine 122 is a called facsimile machine and transmits an NSF signal and that the facsimile machine 112 is a calling facsimile machine and transmits an NSS signal, the NSF signal and the NSS signal are identified as follows:

An NSF1-FG signal represents an NSF signal which is transmitted from the called facsimile machine 122 and received at the gateway 222. An NSF1-GG signal represents an NSF signal which is transmitted from the gateway 222 and received at the gateway 212. An NSF2-GF signal represents an NSF signal which is transmitted from the gateway 212 and received at the calling facsimile machine 112.

An NSS1-FG signal represents an NSS signal which is transmitted from the calling facsimile machine 112 and received at the gateway 212. An NSS1-GG signal represents an NSS signal which is transmitted from the gateway 212 and received at the gateway 222. An NSS2-GF signal represents an NSS signal which is transmitted from the gateway 222 and received at the called facsimile machine 122.

On the other hand, assuming that the facsimile machine 112 is a called facsimile machine and transmits an NSF signal and that the facsimile machine 122 is a calling facsimile machine and transmits an NSS signal, an NSF1-FG signal represents an NSF signal which is transmitted from the called facsimile machine 112 and received at the gateway 212, and similarly, the foregoing relationships with respect to the other NSF and NSS signals are also reversed.

Referring to FIG. 9, when the calling-side gateway, for example, the gateway 212, sends a connection request to the called-side gateway 222 to establish the line therebetween, a called/calling communication delay estimating section 71 of the calling-side gateway 212 estimates a communication delay time of a signal transmitted from the called-side gateway 222 to the calling-side gateway 212.

The delay time is estimated by utilizing a procedure regulated by the ICMP (Internet Control Message Protocol), for example. Specifically, the delay time estimation is carried out by transmitting an echo request message to the gateway 222 and measuring a time from transmission of the echo request message to receipt of an echo reply message transmitted from the gateway 222 in response thereto.

When an NSF1-GG signal (NSF1-FG signal of the called facsimile machine 122) is received from the called-side gateway 222, a timer value change information detecting section 72 of the calling-side gateway 212 detects timer value change information included in the received NSF1-GG signal.

Based on the delay time estimated at the called/calling communication delay estimating section 71, a transmitter timer value change information selecting section 73 of the calling-side gateway 212 selects the optimum timer value change information, with respect to signal transmission from the called-side gateway 222 to the calling-side gateway 212, from the timer value change information detected at the timer value change information detecting section 72.

A transmitter timer value change information replacing section 74 of the calling-side gateway 212 transmits the timer value change information selected at the transmitter timer value change information selecting section 73 to the calling facsimile machine 112 as an NSF2-GF signal.

Specifically, the calling-side gateway 212 selects the optimum timer value change information, with respect to signal transmission from the gateway 222 to the gateway 212, from the timer value change information of the called facsimile machine 122 received via the gateway 222, and transmits it to the calling facsimile machine 112. The optimum timer value change information is selected based on an estimated value about a communication delay time of a signal transmitted from the gateway 222 to the gateway 212.

When an NSS1-FG signal is received from the calling facsimile machine 112, the calling-side gateway 212 transmits the received NSS1-FG signal as it is to the called-side gateway 222 as an NSS1-GG signal.

Referring to FIG. 10, when the called-side gateway, for example, the gateway 222, receives a connection request from the calling-side gateway 212 to establish the line therebetween, a calling/called communication delay estimating section 81 of the called-side gateway 222 estimates a communication delay time of a signal transmitted from the calling-side gateway 212 to the called-side gateway 222.

When an NSF1-FG signal is received from the called facsimile machine 122, a timer value change information detecting section 82 of the called-side gateway 222 detects timer value change information included in the received NSF1-FG signal.

Based on the delay time estimated at the calling/called communication delay estimating section 81, a receiver timer value change information selecting section 83 of the called-side gateway 222 selects the optimum timer value change information, with respect to signal transmission from the calling-side gateway 212 to the called-side gateway 222, from the timer value change information detected at the timer value change information detecting section 82.

When an NSS1-GG signal (NSS1-FG signal of the calling facsimile machine 112) is received from the calling-side gateway 212, a receiver timer value change information replacing section 84 of the called-side gateway 222 replaces timer value change information included in the received NSS1-GG signal with the timer value change information selected at the receiver timer value change information selecting section 83, and transmits an NSS2-GF signal including the substituted timer value change information to the called facsimile machine 122.

Specifically, the called-side gateway 222 selects the optimum timer value change information from the timer value change information of the called facsimile machine 122 and transmits it to the facsimile machine 122. This optimum timer value change information is selected based on an estimated value about a communication delay time of a signal transmitted from the gateway 212 to the gateway 222.

When the NSF1-FG signal is received from the called facsimile machine 122, the gateway 222 transmits the received NSF1-FG signal as it is to the calling-side gateway 212 as an NSF1-GG signal.

Figure 11:
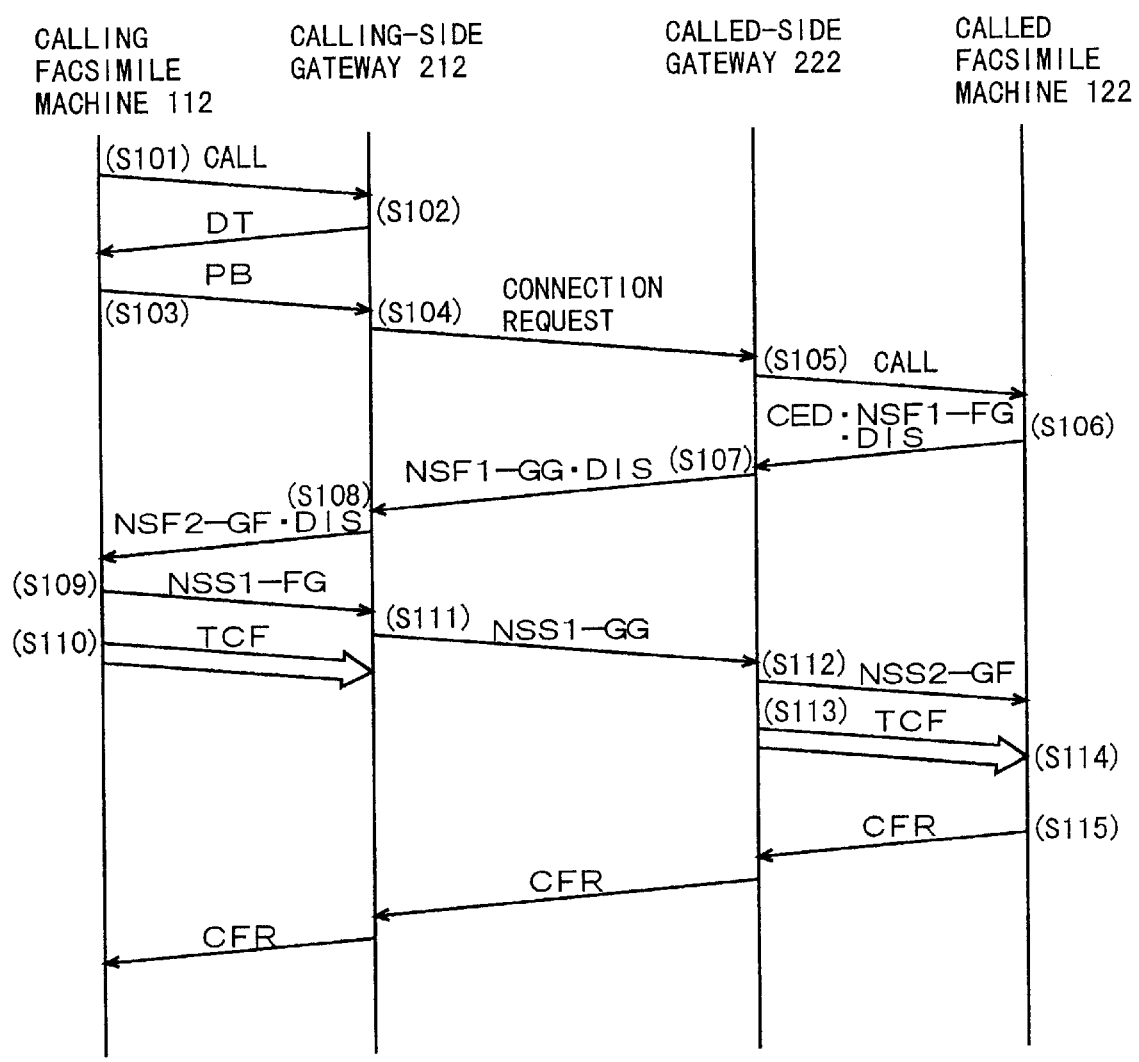
FIG. 11 is a diagram showing a facsimile communication operation sequence according to the second preferred embodiment of the present invention.

FIG. 11 is a diagram showing a facsimile communication operation sequence according to the second preferred embodiment of the present invention.

It is assumed that the facsimile machine 112 is a calling facsimile machine working as a transmitter for transmitting image data, while the facsimile machine 122 is a called facsimile machine working as a receiver for receiving image data.

First, the facsimile machine 112 makes a call to the gateway 212 (step S101). In response to the call from the facsimile machine 112 to the gateway 212, the line is established therebetween. Then, a dial tone DT is transmitted from the gateway 212 to the facsimile machine 112 (step S102). In response to receipt of the dial tone DT from the gateway 212, the facsimile machine 112 transmits a dial number (PB signal) of the facsimile machine 122 to the gateway 212 (step S103).

In response to receipt of the PB signal, the gateway 212 retrieves an IP address of the gateway 222 in the packet communication network 400 from addresses stored in a RAM 34, and transmits to the gateway 222 a connection request adding the dial number of the facsimile machine 122. At this time, the called/calling communication delay estimating section 71 of the calling-side gateway 212 estimates a communication delay time of a signal transmitted from the gateway 222 to the gateway 212 (step S104).

In response to receipt of the connection request from the gateway 212, the gateway 222 makes a call to the facsimile machine 122, and the calling/called communication delay estimating section 81 of the gateway 222 estimates a communication delay time of a signal transmitted from the gateway 212 to the gateway 222 (step S105).

In response to receipt of the call from the gateway 222, the facsimile machine 122 closes the line between the gateway 222 and the facsimile machine 122 and transmits a CED signal, an NSF signal and a DIS in order.

At this time, a timer value change information transmitting section 51 of the facsimile machine 122 transmits three kinds of timer value change information, i.e. timer value change information of "twofold", timer value change information of "threefold" and timer value change information of "fourfold", to the gateway 222 as an NSF1-FG signal (step S106).

The gateway 222 divides the NSF1-FG signal and the DIS received from the facsimile machine 122 into packets and transmits the packets to the gateway 212.

At this time, the timer value change information detecting section 82 of the gateway 222 detects the timer value change information, i.e. the timer value change information of "twofold", the timer value change information of "threefold" and the timer value change information of "fourfold", included in the received NSF1-FG signal.

Then, the receiver timer value change information selecting section 83 of the gateway 222 selects, for example, the optimum timer value change information of "twofold" from the detected timer value change information based on the communication delay time estimated at the calling/called communication delay estimating section 81 (step S107).

The gateway 212 reconstructs the NSF1-GG signal and the DIS from the packets received from the gateway 222 and transmits them to the facsimile machine 112.

At this time, the timer value change information detecting section 72 of the gateway 212 detects the timer value change information, i.e. the timer value change information of "twofold", the timer value change information of "threefold" and the timer value change information of "fourfold", included in the received NSF1-GG signal.

Then, the transmitter timer value change information selecting section 73 of the gateway 212 selects, for example, the optimum timer value change information of "fourfold" from the detected timer value change information based on the communication delay time estimated at the called/calling communication delay estimating section 71.

Based on the selection at the transmitter timer value change information selecting section 73, the transmitter timer value change information replacing section 74 replaces the timer value change information of "twofold", "threefold" and "fourfold" included in the NSF1-GG signal with the selected timer value change information of "fourfold", and transmits an NSF2-GF signal including the substituted timer value change information of "fourfold" to the facsimile machine 112 (step S108).

The facsimile machine 112 receives the NSF2-GF signal and the DIS. A timer value change information detecting section 63 of the calling facsimile machine 112 detects the timer value change information included in the NSF2-GF signal, that is, the timer value change information of "fourfold" is detected. Accordingly, a timer value change information selecting section 64 of the facsimile machine 112 selects the timer value change information of "fourfold". Based on the selection at the selecting section 64, a timer value changing section 53 increases the timer value fourfold. Simultaneously, a timer value change information transmitting section 65 transmits an NSS1-FG signal including the timer value change information of "fourfold" to the gateway 212 (step S109).

Then, the facsimile machine transmits a TCF signal to the gateway 212. Simultaneously, a timing monitor section 54 of the facsimile machine 112 sets a fourfold-increased T4 timer value (12 seconds) in a timer 55 (step S110).

The gateway 212 divides the NSS1-FG signal received from the facsimile machine 112 into packets and transmits the packets to the gateway 222 as an NSS1-GG signal, and then goes into a standby state awaiting receipt of the TCF signal from the facsimile machine 112. When the TCF signal is normally received, the gateway 212 goes into a standby state awaiting receipt of a CFR signal from the called-side gateway 222 (step S111).

The called-side gateway 222 reconstructs the NSS1-GG signal from the packets received from the calling-side gateway 212 and transmits an NSS2-GF signal to the called facsimile machine 122.

Specifically, as described before, the receiver timer value change information replacing section 84 of the gateway 222 replaces the timer value change information of "fourfold" included in the received NSS1-GG signal with the timer value change information of "twofold" selected at the receiver timer value change information selecting section 83 at step S107, and transmits the NSS2-GF signal including the substituted timer value change information of "twofold" to the called facsimile machine 122 (step S112).

Then, the gateway 222 produces a TCF signal according to a modem mode set by the NSS2-GF signal and transmits it to the facsimile machine 122 (step S113).

When the NSS2-GF signal is received at the called facsimile machine 122, a timer value change information detecting section 52 thereof detects the timer value change information of "twofold" included in the NSS2-GF signal. Then, a timer value changing section 53 of the facsimile machine 122 increases the timer value twofold (step S114).

When the TCF signal is normally received from the gateway 222, the facsimile machine 122 transmits a CFR signal to the gateway 222. Simultaneously, at a timing monitor section 54 of the facsimile machine 122, a twofold-increased T2 timer value (12 seconds) is set in a timer 55 (step S115).

Since a subsequent portion of the sequence is like the corresponding portion of the sequence of the first preferred embodiment shown in FIG. 7, explanation thereof is omitted.

As described above, in the calling facsimile machine 112, the timer value is increased fourfold based on the timer value change information of "fourfold" selected at the gateway 212. On the other hand, in the called facsimile machine 122, the timer value is increased twofold based on the timer value change information of "twofold" selected at the gateway 222.

According to the foregoing second preferred embodiment of the present invention, the called/calling communication delay estimating section 71 of the calling-side gateway, for example, the gateway 212, estimates a communication delay time of a signal transmitted in a direction from the called-side gateway 222 to the calling-side gateway 212.

The timer value change information detecting section 72 of the calling-side gateway 212 detects the timer value change information included in the NSF1-GG signal transmitted from the called-side gateway 222. The transmitter timer value change information selecting section 73 selects the optimum timer value change information with respect to the signal transmission in the foregoing direction, from the detected timer value change information based on the communication delay time estimated at the called/calling communication delay estimating section 71.

The transmitter timer value change information replacing section 74 replaces the timer value change information included in the received NSF1-GG signal with the timer value change information selected at the transmitter timer value change information selecting section 73, and transmits the NSF2-GF signal including the substituted timer value change information to the calling facsimile machine 112.

Accordingly, in the calling facsimile machine 112, the optimum timer value change information with respect to the signal transmission in the foregoing direction is selected based on the received NSF2-GF signal.

On the other hand, the calling/called communication delay estimating section 81 of the called-side gateway 222 estimates a communication delay time of a signal transmitted in a direction opposite to the foregoing direction from the calling-side gateway 212 to the called-side gateway 222.

The timer value change information detecting section 82 of the called-side gateway 222 detects the timer value change information included in the NSF1-FG signal transmitted from the called facsimile machine 122. The receiver timer value change information selecting section 83 selects the optimum timer value change information with respect to the signal transmission in the foregoing opposite direction, from the detected timer value change information based on the communication delay time estimated at the calling/called communication delay estimating section 81.

The receiver timer value change information replacing section 84 replaces the timer value change information included in the NSS1-GG signal received from the gateway 212 with the timer value change information selected at the receiver timer value change information selecting section 83, and transmits the NSS2-GF signal including the substituted timer value change information to the called facsimile machine 122.

Accordingly, in the called facsimile machine 122, the optimum timer value change information with respect to the signal transmission in the foregoing opposite direction is selected based on the received NSS2-GF signal.

Thus, in the second preferred embodiment of the present invention, a communication delay time of a signal transmitted from the gateway 222 to the gateway 212 can be estimated by the gateway 212 to change a timer value of the facsimile machine 112 using timer value change information selected based on the estimated signal delay.

Similarly, a communication delay time of a signal transmitted from the gateway 212 to the gateway 222 can be estimated by the gateway 222 to change a timer value of the facsimile machine 122 using timer value change information selected based on the estimated signal delay.

In the foregoing first preferred embodiment, the timer value change information is commonly selected at the calling and called facsimile machines irrespective of the state of the packet communication network 400.

On the other hand, in the second preferred embodiment, the optimum timer value change information can be selected for each of the calling and called facsimile machines in consideration of the state of the packet communication network 400 so that the optimum timer values can be set in both facsimile machines. This can achieve more reliable facsimile communication.

At step S108 in FIG. 11, the transmitter timer value change information selecting section 73 of the gateway 212 selects only one kind of the optimum timer value change information, i.e. the timer value change information of "fourfold", from the timer value change information of "twofold", "threefold" and "fourfold" included in the NSF1-GG signal. However, it may be arranged that the transmitter timer value change information selecting section 73 selects more than one kind of the optimum timer value change information. In this case, the calling facsimile machine 112 is arranged to select one from the plural kinds of the optimum timer value change information.

In the first and second preferred embodiments, the timer value change information is composed of information for increasing the timer value by integer times, such as "twofold, "threefold" and "fourfold". However, it may be arranged that timer value change information is composed of information for increasing the timer value by addition, or that timer value change information is in the form of changed timer values themselves. In other words, it is sufficient that timer value change information is composed of information which can change the timer value easily and precisely.

<Third Embodiment>

Figure 12:
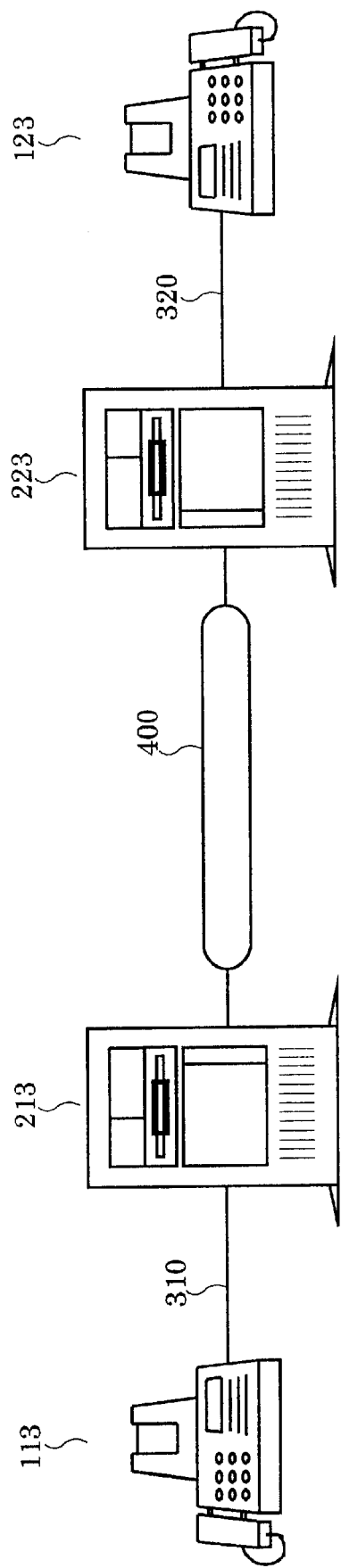
FIG. 12 is a diagram showing a structure of a facsimile communication system according to a third preferred embodiment of the present invention.

FIG. 12 is a diagram showing a structure of a facsimile communication system according to the third preferred embodiment of the present invention.

As shown in FIG. 12, a facsimile machine 113 is connected to a gateway 213 via a telephone line 310. The gateway 213 is connected to a packet communication network 400. On the other hand, a facsimile machine 123 is connected to a gateway 223 via a telephone line 320. The gateway 223 is connected to the packet communication network 400.

Facsimile communication between the facsimile machine 113 and the facsimile machine 123 is carried out via the packet communication network 400.

The facsimile machines 113 and 123 have mutually the same structure, and the gateways 213 and 223 also have mutually the same structure. Accordingly, the facsimile machine 113 and the gateway 213 will be described hereinbelow.

The facsimile machine 113 is the same in hardware structure as the facsimile machine 11 shown in FIG. 4, but a ROM 13 of the facsimile machine 113 stores, instead of the program for producing the functional blocks shown in FIGS. 1 and 2, a flow control program which is executed between the facsimile machine 113 and the gateway 213.

Figure 13:
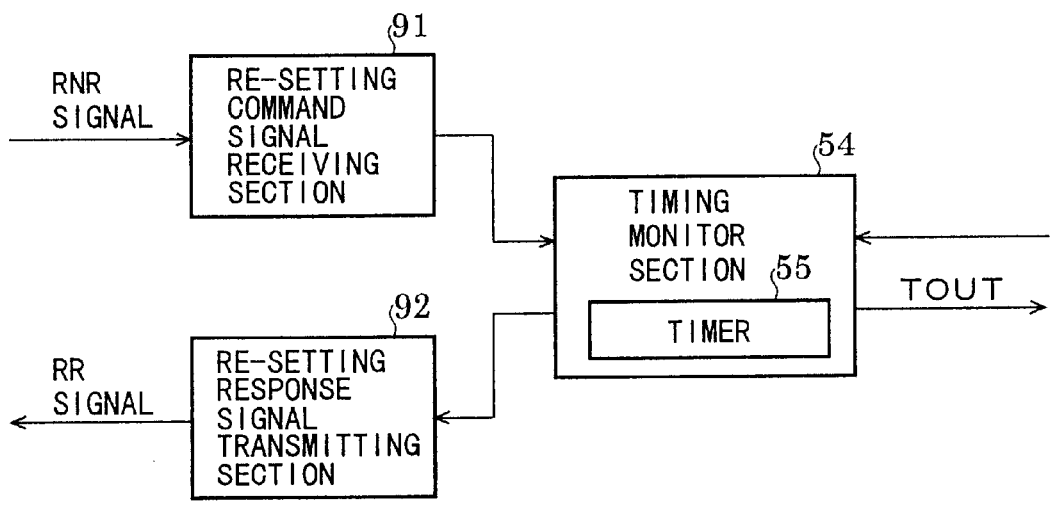
FIG. 13 is a functional block diagram showing the main functions of a facsimile machine according to the third preferred embodiment of the present invention.

FIG. 13 shows functional blocks of the facsimile machine 113 produced by executing the flow control program stored in the ROM 13. As appreciated, the dial number storage section 61 and the dial number search section 62 shown in FIG. 2 are not produced in the facsimile machine 113.

In FIG. 13, a re-setting command signal receiving section 91 has a function of detecting a response signal from the gateway 213 relative to signal transmission from the facsimile machine 113 to the gateway 213, and a further function of detecting a RNR (Receive Not Ready) signal from the gateway 213.

A timing monitor section 54 has a function of monitoring whether a signal from a counterpart facsimile machine (facsimile machine 123) is received within a normal response time. Specifically, the timing monitor section 54 sets a timer value of the ITU-T Recommendation T. 30 in a timer 55 and, when a response signal from the gateway 213 is not received within a time represented the timer value set in the timer 55, the timer monitor section 54 outputs a time-out signal TOUT indicative of it to the gateway 213.

The timing monitor section 54 has a further function of, when the re-setting command signal receiving section 91 detects an RNR signal from the gateway 213, interrupting counting of the timer 55 and setting again the same timer value in the timer 55, i.e. re-setting the timer 55 to the same timer value.

The re-setting response signal transmitting section 92 has a function of transmitting an RR (Receive Ready) signal to the gateway 213 when the timer 55 is re-set to the same timer value in response to the RNR signal detected at the re-setting command signal receiving section 91.

The gateway 213 is the same in hardware structure as the gateway 211 shown in FIG. 5, but a ROM 33 thereof stores a flow control program which is executed between the gateway 213 and the facsimile machine 113.

Figure 14:
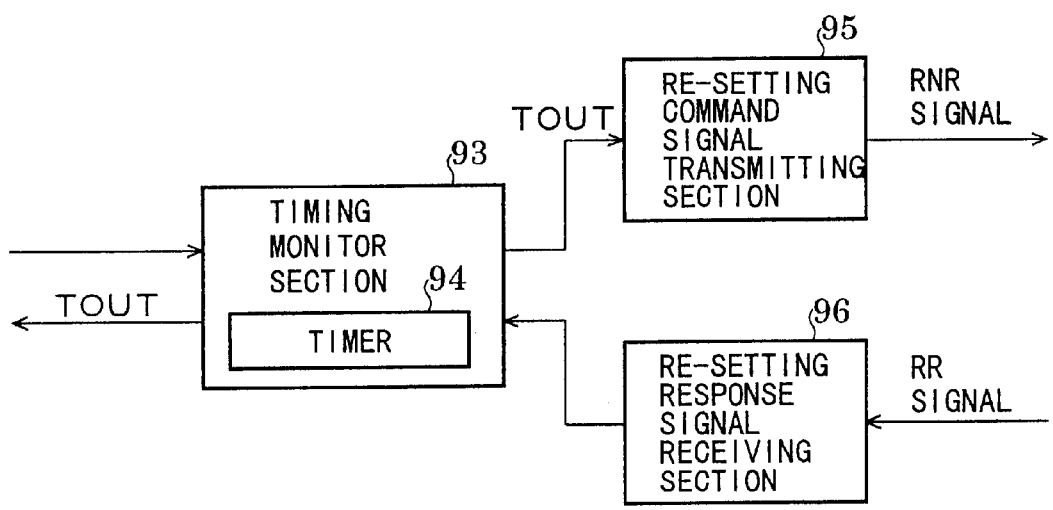
FIG. 14 is a functional block diagram showing the main functions of a gateway according to the third preferred embodiment of the present invention.

FIG. 14 shows functional blocks of the gateway 213 produced by executing the flow control program stored in the ROM 33.

In FIG. 14, a timing monitor section 93 monitors whether a response signal from the facsimile machine 123 via the gateway 223 is received within a normal response time, after transmitting a signal received from the facsimile machine 113 to the facsimile machine 123 via the gateway 223.

Specifically, the timing monitor section 93 sets a timer value in a timer 94 and, when the response signal via the gateway 223 is not received within a time represented by the timer value set in the timer 94, the timer monitor section 93 outputs a time-out signal TOUT indicative of it to a re-setting command signal transmitting section 95.

The timer value of the timer 94 is set corresponding to the timer value of the timer 55 of the facsimile machine 113. The timer value of the timer 94 is set to be smaller than the timer value of the timer 55 of the facsimile machine 113 in consideration of a time in which a signal transmitted from the facsimile machine 113 is received at the gateway 213 and a time in which a signal transmitted from the gateway 213 is received at the facsimile machine 113.

In response to receipt of the time-out signal TOUT from the timing monitor section 93, the re-setting command signal transmitting section 95 transmits an RNR signal to the facsimile machine 113.

When the facsimile machine 113 transmits an RR signal in response to the RNR signal transmitted from the re-setting command signal transmitting section 95 to the facsimile machine 113, a re-setting response signal receiving section 96 detects the RR signal.

The timing monitor section 93 has a further function of, when the re-setting response signal receiving section 96 detects the RR signal from the facsimile machine 113, interrupting counting of the timer 94 and re-setting the timer 94 to the same timer value.

Until a response signal from the facsimile machine 123 via the gateway 223 is received within a time represented by a timer value set in the timer 94, the timing monitor section 93 repeats re-setting of the timer 94.

Figure 15:
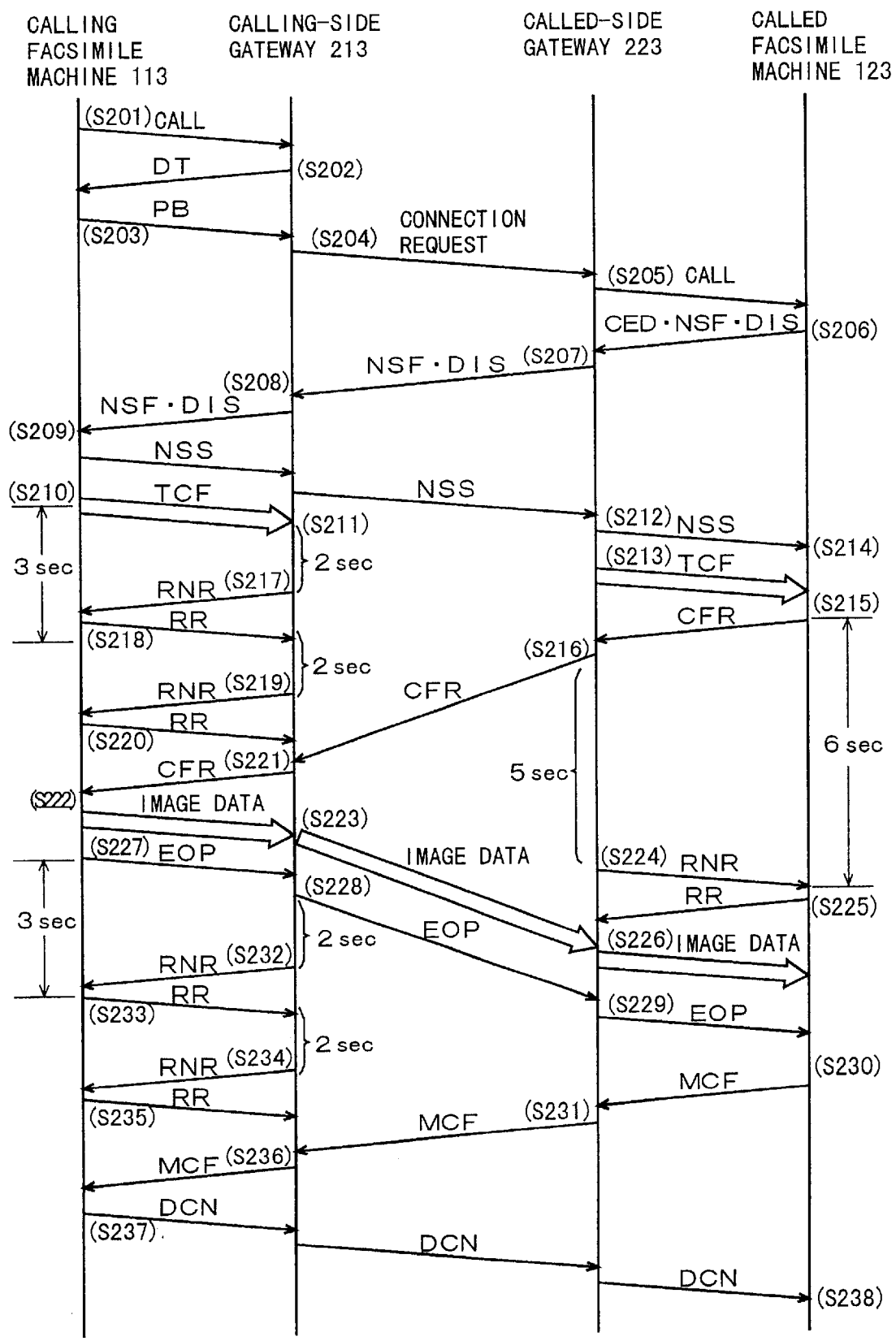
FIG. 15 is a diagram showing a facsimile communication operation sequence according to the third preferred embodiment of the present invention.

FIG. 15 is a diagram showing a facsimile communication operation sequence according to the third preferred embodiment of the present invention.

It is assumed that the facsimile machine 113 is a calling facsimile machine working as a transmitter for transmitting image data, while the facsimile machine 123 is a called facsimile machine working as a receiver for receiving image data.

First, the facsimile machine 113 makes a call to the gateway 213 (step S201). In response to the call from the facsimile machine 113 to the gateway 213, the line is established therebetween. Then, a dial tone DT is transmitted from the gateway 213 to the facsimile machine 113 (step S202). In response to receipt of the dial tone DT from the gateway 213, the facsimile machine 113 transmits a dial number (PB signal) of the facsimile machine 123 to the gateway 213 (step S203).

In response to receipt of the PB signal, the gateway 213 retrieves an IP address of the called-side gateway 223 in the packet communication network 400 from addresses stored in a RAM 34 of the calling-side gateway 213, and transmits to the called-side gateway 223 a connection request adding the dial number of the facsimile machine 123 (step S204).

In response to receipt of the connection request from the gateway 213, the gateway 223 makes a call to the facsimile machine 123 (step S205).

In response to receipt of the call from the gateway 223, the facsimile machine 123 closes the line between the gateway 223 and the facsimile machine 123 and transmits a CED signal, an NSF signal and a DIS in order to the gateway 223. The NSF signal includes flow control information indicative of having a flow control function (step S206).

The gateway 223 divides the NSF signal and the DIS received from the facsimile machine 123 into packets and transmits the packets to the gateway 213 (step S207).

The gateway 213 reconstructs the NSF signal and the DIS from the packets received from the gateway 223 and transmits them to the facsimile machine 113 (step S208).

When the NSF signal and the DIS are received, the facsimile machine 113 detects the flow control information included in the NSF signal so that execution of a flow control is set in the facsimile machine 113. Then, the facsimile machine 113 transmits to the gateway 213 an NSS signal including flow control information indicative of the setting of flow control execution (step S209).

Subsequently, the facsimile machine 113 transmits a TCF signal to the gateway 213. Simultaneously, the timing monitor section 54 of the facsimile machine 113 sets a T4 timer value (for example, 3 seconds) in the timer 55 (step S210).

The calling-side gateway 213 divides the NSS signal received from the facsimile machine 113 into packets and transmits the packets to the called-side gateway 223, and then goes into a standby state awaiting receipt of the TCF signal from the facsimile machine 113. In the meantime, the gateway 213 detects the flow control information included in the received NSS signal so that flow control execution is set in the gateway 213. Thereafter, when the TCF signal is normally received from the calling facsimile machine 113, the calling-side gateway 213 goes into a standby state awaiting receipt of a CFR signal from the called-side gateway 223. At this time, the timing monitor section 93 of the gateway 213 sets a T4*a* timer value (for example, 2 seconds) in the timer 94 (step S211).

The called-side gateway 223 reconstructs the NSS signal from the packets received from the calling-side gateway 213 and transmits the NSS signal to the called facsimile machine 123. In the meantime, the gateway 223 detects the flow control information included in the received NSS signal so that flow control execution is set in the gateway 223 (step S212).

Then, the gateway 223 produces a TCF signal according to a modem mode set by the NSS signal and transmits it to the called facsimile machine 123 (step S213).

When the NSS signal is received, the facsimile machine 123 detects the flow control information included in the NSS signal so that flow control execution is set in the facsimile machine 123 (step S214).

After receipt of the NSS signal, when the TCF signal is normally received from the gateway 223, the facsimile machine 123 transmits a CFR signal to the gateway 223. Simultaneously, the timing monitor section 54 of the facsimile machine 123 sets a T2 timer value (for example, 6 seconds) in the timer 55 (step S215).

When the CFR signal is received from the facsimile machine 123, the gateway 223 divides the received CFR signal into packets and transmits the packets to the gateway 213. Simultaneously, the timing monitor section 93 of the gateway 223 set a T2*a* timer value (for example, 5 seconds) in the timer 94. At this time, if a large communication delay occurs in the packet communication network 400, the packets (CFR signal) reach the gateway 213 with a corresponding delay (step S216).

If, due to this delay, the gateway 213 can not receive the packets (CFR signal) from the gateway 223 within the T4*a* timer value (2 seconds) set in the timer 94 at step S211, the re-setting command signal transmitting section 95 of the gateway 213 transmits an RNR signal to the facsimile machine 113 after a lapse of the T4*a* timer value from the receipt of the TCF signal from the facsimile machine 113 (step S217).

When the RNR signal from the gateway 213 is received, the re-setting command signal receiving section 91 of the facsimile machine 113 detects it. In response to the detection of the RNR signal, the timing monitor section 54 of the facsimile machine 113 re-sets the timer 55 to the same T4 timer value (3 seconds), and the re-setting response signal transmitting section 92 transmits an RR signal to the gateway 213.

When the RR signal from the facsimile machine 113 is received at the re-setting response signal receiving section 96 of the gateway 213, the timing monitor section 93 re-sets the timer 94 to the same T4*a* timer value (2 seconds) (step S218).

Further, if the gateway 213 can not receive the packets (CFR signal) from the gateway 223 within the T4*a* timer value (2 seconds) re-set in the timer 94 at step S218, the re-setting command signal transmitting section 95 of the gateway 213 retransmits the RNR signal to the facsimile machine 113 after a lapse of the T4*a* timer value re-set in the timer 94 (step S219).

When the re-setting command signal receiving section 91 of the facsimile machine 113 detects the retransmitted RNR signal, the timing monitor section 54 re-sets the timer 55 to the same T4 timer value (3 seconds). Then, the re-setting response signal transmitting section 92 retransmits the RR signal to the gateway 213.

When the re-setting response signal receiving section 96 of the gateway 213 receives the RR signal retransmitted from the facsimile machine 113, the timing monitor section 93 re-sets the timer 94 to the same T4*a* timer value (2 seconds) (step S220).

As described above, until the gateway 213 receives the CFR signal from the gateway 223, the RNR and RR signals are exchanged between the gateway 213 and the facsimile machine 113 so that the timer 94 and the timer 55 are re-set to the given timer values, respectively. With this arrangement, the delay of the CFR signal transmitted from the gateway 223 to the gateway 213 can be absorbed. If, however, the CFR signal is not received at the gateway 213 even after given number times exchanges of the RNR and RR signals, it is judged that a communication failure has occurred so that the communication is forcibly interrupted.

When the packets (CFR signal) are received from the gateway 223, the gateway 213 reconstructs the CFR signal from the received packets and transmits it to the facsimile machine 113 (step S221).

In response to receipt of the CFR signal from the gateway 213, the facsimile machine 113 transmits image data to the gateway 213 (step S222).

The gateway 213 divides the image data received from the facsimile machine 113 into packets and transmits the packets to the gateway 223. At this time, if a large communication delay is caused in the packet communication network 400, the packets (image data) reach the gateway 223 with a corresponding delay (step S223).

If, due to this delay, the packets (image data) are not received at the gateway 223 within the T2*a* timer value (5 seconds) set in the timer 94 of the gateway 223 at step S216, the re-setting command signal transmitting section 95 of the gateway 223 transmits an RNR signal to the facsimile machine 123 (step S224).

When the RNR signal from the gateway 223 is received, the re-setting command signal receiving section 91 of the facsimile machine 123 detects it. In response to the detection of the RNR signal, the timing monitor section 54 of the facsimile machine 123 re-sets the timer 55 to the same T2 timer value (6 seconds), and the re-setting response signal transmitting section 92 transmits an RR signal to the gateway 223.

When the RR signal from the facsimile machine 123 is received at the re-setting response signal receiving section 96 of the gateway 223, the timing monitor section 93 re-sets the timer 94 to the same T2*a* timer value (5 seconds) (step S225).

In this fashion, until the gateway 223 receives the packets (image data) from the gateway 213, the RNR and RR signals are exchanged between the gateway 223 and the facsimile machine 123 so that the timer 94 and the timer 55 are re-set to the given timer values, respectively. With this arrangement, the delay of the image data transmitted from the gateway 213 to the gateway 223 can be absorbed. If, however, the image data are not received at the gateway 223 even after given number times exchanges of the RNR and RR signals, it is judged that a communication failure has occurred so that the communication is forcibly interrupted.

When the packets (image data) are received from the gateway 213, the gateway 223 reconstructs the image data from the received packets and transmits the image data to the facsimile machine 123. Then, the image data is received at the facsimile machine 123 (step S226).

After the transmission of the image data is finished, the calling facsimile machine 113 transmits an EOP signal to the gateway 213. Simultaneously, the timing monitor section 54 of the facsimile machine 113 sets a T4 timer value (for example, 3 seconds) in the timer 55 (step S227).

The gateway 213 divides the received EOP signal into packets and transmits the packets to the gateway 223. At this time, the timing monitor section 93 of the gateway 213 sets a T4a timer value (for example, 2 seconds) in the timer 94. If the delay occurs in transmission of the image data to the gateway 223 as described at step S223, a delay also occurs in transmission of the EOP signal to the gateway 223 (step S228).

The gateway 223 reconstructs the EOP signal from the packets received from the gateway 213 and transmits the EOP signal to the facsimile machine 123 (step S229).

In response to receipt of the EOP signal from the gateway 223, the facsimile machine 123 transmits an MCF signal to the gateway 223 (step S230).

The gateway 223 divides the received MCF signal into packets and transmits the packets to the gateway 213.

If the delay occurs in transmission of the image data to the gateway 223 as described at step S223, a delay also occurs in transmission of the MCF signal from the gateway 223 to the gateway 213.

Thus, the MCF signal reaches the gateway 213 while being subjected to an influence of the delay of the image data at step S223 (step S231).

In this case, if the gateway 213 does not receive the packets (MCF signal) from the gateway 223 within the T4a timer value (2 seconds) set in the timer 94 at step S228, the re-setting command signal transmitting section 95 of the gateway 213 transmits an RNR signal to the facsimile machine 113 (step S232).

When the RNR signal from the gateway 213 is received, the re-setting command signal receiving section 91 of the facsimile machine 113 detects it. In response to the detection of the RNR signal, the timing monitor section 54 of the facsimile machine 113 re-sets the timer 55 to the same T4 timer value (3 seconds), and the re-setting response signal transmitting section 92 transmits an RR signal to the gateway 213.

When the RR signal from the facsimile machine 113 is received at the re-setting response signal receiving section 96 of the gateway 213, the timing monitor section 93 re-sets the timer 94 to the same T4a timer value (2 seconds) (step S233).

Further, if the gateway 213 does not receive the packets (MCF signal) from the gateway 223 within the T4a timer value (2 seconds) re-set in the timer 94 at step S233, the re-setting command signal transmitting section 95 of the gateway 213 retransmits the RNR signal to the facsimile machine 113 (step S234).

When the re-setting command signal receiving section 91 of the facsimile machine 113 detects the retransmitted RNR signal, the timing monitor section 54 re-sets the timer 55 to the same T4 timer value (3 seconds). Then, the re-setting response signal transmitting section 92 retransmits the RR signal to the gateway 213 (step S235).

As described above, until the gateway 213 receives the MCF signal from the gateway 223, the RNR and RR signals are exchanged between the gateway 213 and the facsimile machine 113 so that the timer 94 and the timer 55 are re-set to the given timer values, respectively. With this arrangement, the delay of the MCF signal transmitted from the gateway 223 to the gateway 213 can be absorbed. If, however, the MCF signal is not received at the gateway 213 even after given number times exchanges of the RNR and RR signals, it is judged that a communication failure has occurred so that the communication is forcibly interrupted.

When the packets (MCF signal) are received from the gateway 223, the gateway 213 reconstructs the MCF signal from the received packets and transmits it to the facsimile machine 113 (step S236).

In response to receipt of the MCF signal, the facsimile machine 113 transmits a DCN signal to the gateway 213 so that the line between the facsimile machine 113 and the gateway 213 is disconnected (step S237).

The DCN signal is transmitted to the facsimile machine 123 via the gateways 213 and 223 to finally disconnect the line between the facsimile machine 123 and the gateway 223, so that the communication between the facsimile machines 113 and 123 is terminated (step S238).

As described above, according to the third preferred embodiment of the present invention, when transmission, from the gateway 213 to the gateway 223, of a response signal relative to a transmitted signal (e.g. image data in response to CFR signal) is delayed, until the gateway 223 receives the response signal from the gateway 213, the RNR and RR signals are exchanged between the gateway 223 and the facsimile machine 123 so that the timer 94 and the timer 55 are re-set to the given timer values, respectively. With this arrangement, the delay of the signal can be absorbed.

Similarly, when transmission, from the gateway 223 to the gateway 213, of a response signal relative to a transmitted signal (e.g. CFR signal in response to TCF signal; MCF signal in response to EOP signal) is delayed, until the gateway 213 receives the response signal from the gateway 223, the RNR and RR signals are exchanged between the gateway 213 and the facsimile machine 113 so that the timer 94 and the timer 55 are re-set to the given timer values, respectively. With this arrangement, the delay of the signal can be absorbed.

Therefore, since the communication delay between the gateway 213 and the gateway 223 can be absorbed, the highly reliable facsimile communication can be realized.

In the foregoing first and second preferred embodiments, the communication delay between the gateways is absorbed by the changed timer values. However, when the state of the packet communication network 400 changes momentarily, a time loss becomes large. For example, when the timer value is increased twofold, a time for judging whether retransmission is necessary or not is also increased twofold.

On the other hand, in the third preferred embodiment, the RNR and RR signals are exchanged between the gateway and the facsimile machine only when the signal is delayed, thereby to absorb the delay of the signal. Thus, the delay of the signal can be absorbed more efficiently.

In the third preferred embodiment, the flow controls are executed at both sides, i.e. between the gateway 213 and the facsimile machine 113 and between the gateway 223 and the facsimile machine 123. However, even if it is arranged to execute the flow control only at one side, the delay of the signal from the other side can be absorbed.

In the foregoing first to third preferred embodiments, the facsimile machines are connected to the gateways via the telephone network and the gateways are connected to the packet communication network, so as to constitute the facsimile communication system. However, the packet communication network may be replaced with another communication network, such as a radio communication network. The present invention is effectively applicable to facsimile communication implemented via a communication network whose communication delay is greater than that of the telephone network (wired).

Further, the present invention is also applicable to a facsimile communication system wherein a facsimile machine is provided with a LAN interface and an LCU (see FIG. 5) so as to constitute a composite facsimile machine and the composite facsimile machine is connected to the packet communication network.

<Fourth Embodiment>

Figure 16:
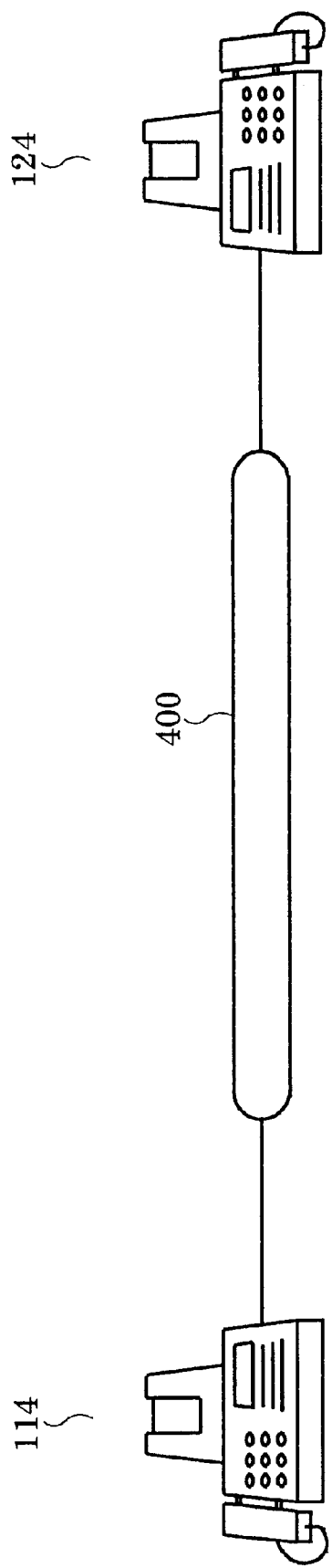
FIG. 16 is a diagram showing a structure of a facsimile communication system according to a fourth preferred embodiment of the present invention.

FIG. 16 is a diagram showing a structure of a facsimile communication system according to the fourth preferred embodiment of the present invention.

As shown in FIG. 16, a facsimile machine 114 and a facsimile machine 124 are directly connected to a packet communication network 400. Facsimile communication between the facsimile machine 114 and the facsimile machine 124 is carried out via the packet communication network 400. Since the facsimile machines 114 and 124 have mutually the same structure, the facsimile machine 114 will be described hereinbelow.

Figure 17:
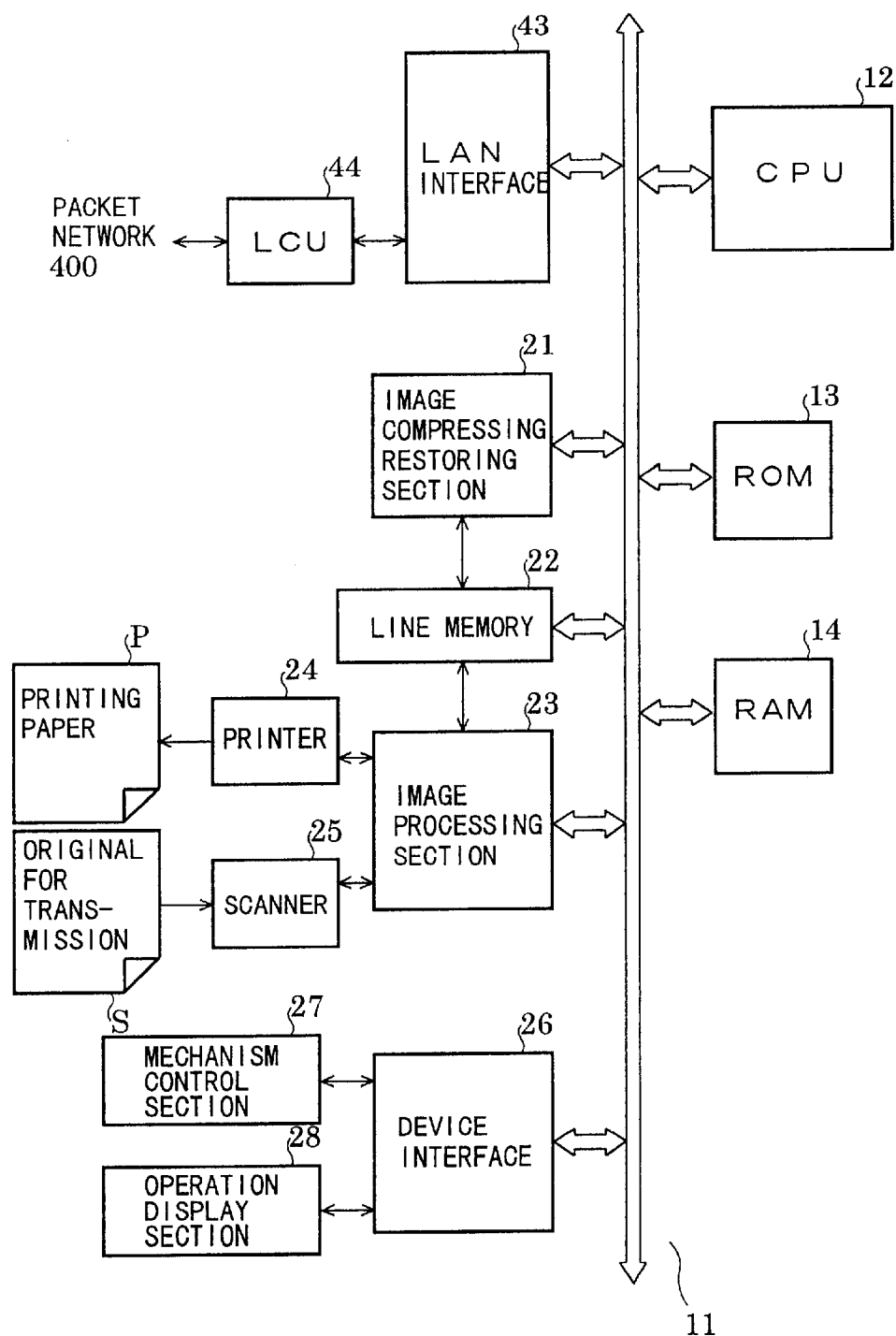
FIG. 17 is a block diagram showing a hardware structure of a facsimile machine according to the fourth preferred embodiment of the present invention.

FIG. 17 is a block diagram showing a hardware structure of the facsimile machine 114 according to the fourth preferred embodiment of the present invention. As shown in FIG. 17, the facsimile machine 114 is basically the same in hardware structure as the facsimile machine 111 shown in FIG. 4, except that a LAN interface 43 and an LCU 44 are provided instead of the modem NCU interface 15, the modem 16 and the NCU 17.

The LAN interface 43 is connected to a bus 11 and the LCU 44. The LAN interface 43 divides a control signal or image data into packets before sending it out to the packet communication network 400 and reconstructs a control signal or image data from packets received via the packet communication network 400. The LCU 44 is connected to the LAN interface 43 and the packet communication network 400 and controls connection and disconnection relative to a counterpart facsimile machine.

When transmitting image data, the image data stored in a RAM 14 is transferred to the LAN interface 43 via the bus 11. The image data transferred to the LAN interface 43 is divided into packets at the LAN interface 43 and sent out to the packet communication network 400 via the LCU 44. On the other hand, when packets (image data) are received at the LCU 44 via the packet communication network 400, the LAN interface 43 reconstructs image data from the received packets. The reconstructed image data is stored in the RAM 14 via the bus 11.

When transmitting a control signal, the control signal is read out from a ROM 13 by a CPU 12 and transferred to the LAN interface 43 via the bus 11. The control signal transferred to the LAN interface 43 is divided into packets at the LAN interface 43 and sent out to the packet communication network 400 via the LCU 44. On the other hand, when packets (control signal) are received at the LCU 44 via the packet communication network 400, the LAN interface 43 reconstructs a control signal from the received packets. The reconstructed control signal is transferred to the CPU 12 via the bus 11. The CPU 12 analyzes the control signal and implements a communication procedure according to the analyzed contents.

In FIG. 17, the RAM 14 stores a table including dial numbers of counterpart facsimile machines and IP addresses thereof in the packet communication network such that the dial number and the IP address are mutually retrievable from each other. When a dial number of a counterpart facsimile machine is inputted via an operation display section 28, an IP address corresponding to the inputted dial number is read out from the table to make a connection request via the LCU 44.

Further, in FIG. 17, the ROM 13 stores a timer value change control program for changing a timer value of the facsimile machine 114 directly connected to the packet communication network 400. By executing the timer value change control program, functional blocks shown in FIGS. 1 and 2 are produced like in the foregoing first preferred embodiment. However, the fourth preferred embodiment differs from the first preferred embodiment in timer value change information and timer value selecting method.

Specifically, in this embodiment, when the facsimile machine 114 works as a called facsimile machine, a timer value change information transmitting section 51 of FIG. 1 transmits timer value change information indicative of whether the facsimile machine 114 is directly connected to the packet communication network 400 and whether the facsimile machine 114 can be operated based on a timer value designated by a calling facsimile machine. A timer value change information detecting section 52 detects timer value change information received from the calling facsimile machine and sends it to a timer value changing section 53. The timer value changing section 53 changes a timer value based on the detected timer value change information and outputs a changed timer value to a timing monitor section 54. The timing monitor section 54 sets the changed timer value in a timer 55.

On the other hand, when the facsimile machine 114 works as a calling facsimile machine, a timer value change information detecting section 63 of FIG. 2 detects timer value change information received from a called facsimile machine and sends it to a timer value change information selecting section 64. Knowing that the called facsimile machine is directly connected to the packet communication network and can be operated by a timer value designated by the subject facsimile machine (calling facsimile machine), the timer value change information selecting section 64 selects a Tmax value which represents a maximum time in which one communication should be implemented. The Tmax value is selected depending on a frequency band acquired in the packet communication network 400, a time required from transmission of a connection request to receipt of an NSF signal, and an image data amount to be transmitted. The timer value changing section 53 changes a timer value to the Tmax value selected at the timer value change information selecting section 64 and outputs it to a timing monitor section 54 and a timer value change information transmitting section 65. The timing monitor section 54 sets the received Tmax value in a timer 55, while the transmitting section 65 transmits to the called facsimile machine timer value change information representing that the calling facsimile machine 114 is directly connected to the packet communication network 400 and implements one communication within the Tmax value.

Now, an operation of the facsimile communication system shown in FIG. 16 will be described with reference to FIG. 18.

Figure 18:
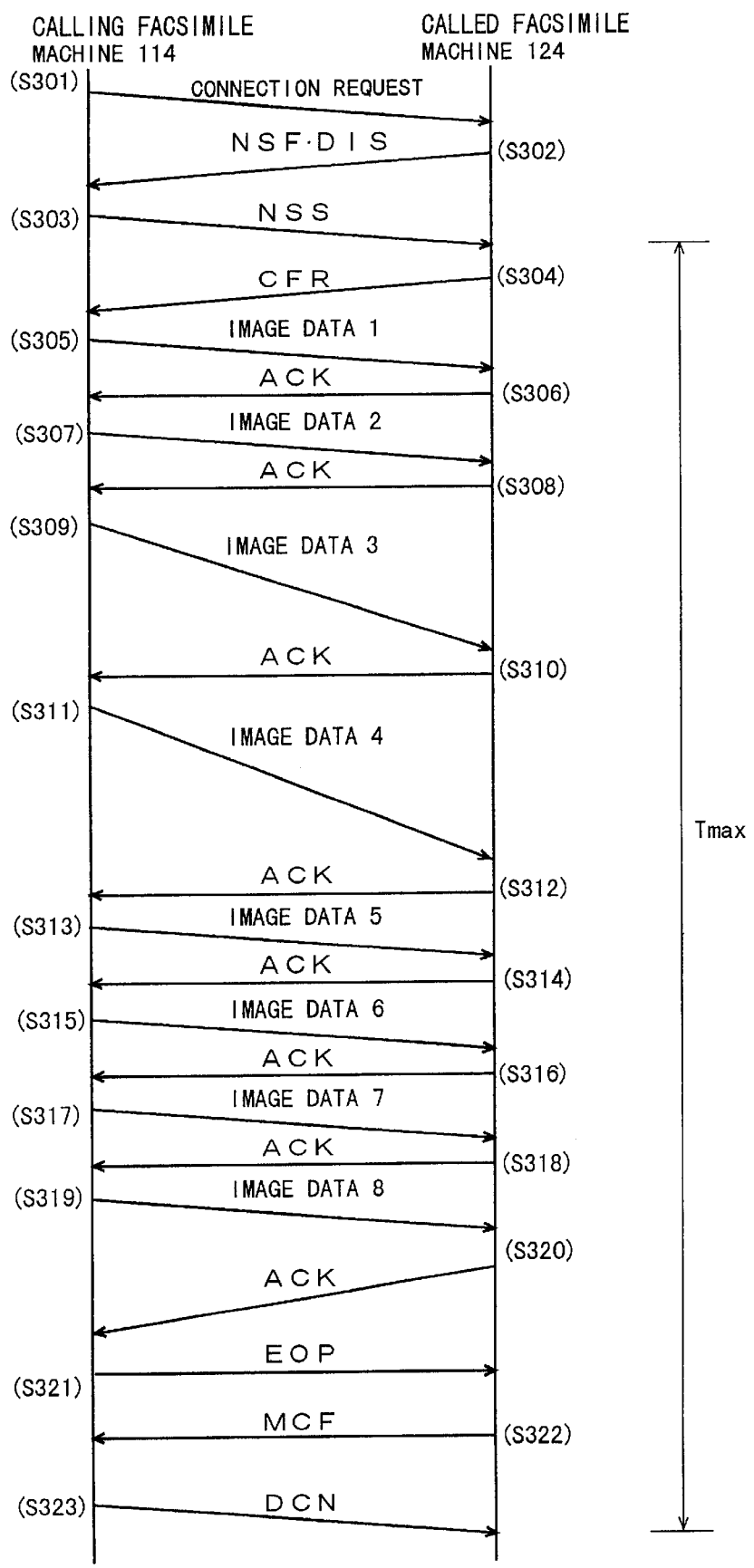
FIG. 18 is a diagram showing a facsimile communication operation sequence according to the fourth preferred embodiment of the present invention.
Figure 19:
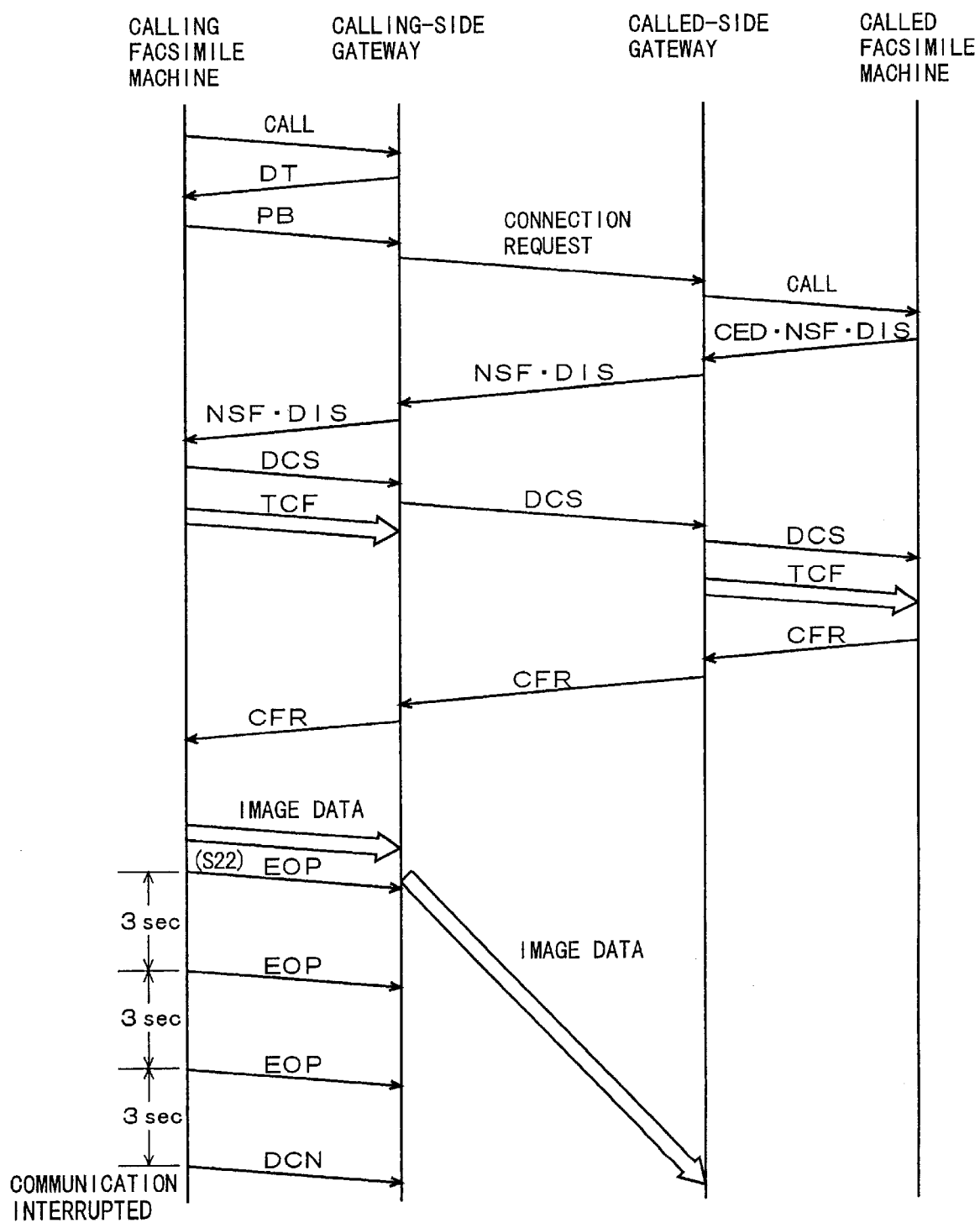
FIG. 19 is a sequence diagram showing an example wherein facsimile communication is interrupted due to a communication delay caused between gateways.

In an example shown in FIG. 18, when a calling facsimile machine, such as the facsimile machine 114, is inputted, via an operation display section 28, with a dial number of the facsimile machine 124 to be a called facsimile machine, the CPU 12 of the facsimile machine 114 retrieves a corresponding IP address from the foregoing table (dial number storage section 61 shown in FIG. 2) stored in the RAM 14 and transmits a connection request to the called facsimile machine 124 (step S301). In response to receipt of the connection request from the calling facsimile machine 114, the called facsimile machine 124 transmits an NSF signal and a DIS to the calling facsimile machine 114. The NSF signal includes a signal notifying that the called facsimile machine 124 is directly connected to the packet communication network 400 and can be operated based on a timer value designated by the calling facsimile machine 114 (step S302).

In response to the NSF signal, the calling facsimile machine 114 transmits an NSS signal to the called facsimile machine 124. The NSS signal includes a signal notifying that the calling facsimile machine 114 is also directly connected to the packet communication network 400 and thus is free of the limitation of the timer values regulated by the ITU-T Recommendation T. 30 and that one communication is implemented within a time defined by the Tmax value (step S303). The Tmax value, i.e. a timer value for one communication, is determined based on a frequency band of the communication acquired in the packet communication network 400, a delay caused from transmission of the connection request to receipt of the NSF signal, and an image data amount to be transmitted.

The called facsimile machine 124 knows from the NSS signal that the communication is free of the timer limitation of the ITU-T Recommendation T. 30, and sets in the timer 55 of the timing monitor section 54 the Tmax timer value notified from the calling facsimile machine 114, and then transmits a CFR signal to the calling facsimile machine 114 (step S304).

In response to receipt of the CFR signal, the calling facsimile machine 114 transmits image data per packet to the called facsimile machine 124 (step S305). When the image data per packet is received, the called facsimile machine 124 transmits an ACK signal to the calling facsimile machine 114 (step S306).

In the example of FIG. 18, the calling facsimile machine 114 transmits image data 1 to image data 8 per packet (steps S305, S307, ..., S319) and the called facsimile machine 124 transmits ACK signals in response to receipt of the corresponding packets (steps S306, S308, ..., S320). Transmission of the image data 1 to the image data 8 is free of the limitation of the timer values regulated by the ITU-T Recommendation T. 30. Accordingly, even if a delay is caused in transmission of each of the image data 1 to 8, the communication is not interrupted until a lapse of the Tmax value.

After the transmission of the image data 1 to 8, the calling facsimile machine 114 transmits an EOP signal to the called facsimile machine 124 (step S 321). In response to receipt of the EOP signal, the called facsimile machine 124 transmits an MCF signal to the calling facsimile machine 114 (step S322). The calling facsimile machine 114 recognizes from receipt of the MCF signal that the transmission of the image data is normally carried out, and transmits a DCN signal to the called facsimile machine 124 so that the communication is finished (step S323).

As described above, according to the fourth preferred embodiment of the present invention, the calling facsimile machine determines the maximum time for implementing one communication based on a frequency band of the communication acquired in the packet communication network, a time required from transmission of the connection request to receipt of the NSF signal, and the image data amount to be transmitted, and transmits the determined maximum time to the called facsimile machine as a timer value. Since the communication between the calling and called facsimile machines is executed by monitoring the timer value of the foregoing maximum time, even if a communication delay is temporarily caused in the packet communication network, the highly reliable communication can be achieved.

In the foregoing first to third preferred embodiments, the timer value change information or the flow control information is transmitted using the NSF signal and the NSS signal regulated by the ITU-T Recommendation T. 30. However, if such information is adopted as the standard communication capability information of the ITU-T Recommendation T. 30, it can be transmitted using the DIS and the DCS.

While the present invention has been described in terms of the preferred embodiments, the invention is not to be limited thereto, but can be embodied in various ways without departing from the principle of the invention as defined in the appended claims.

I claim:

1. A facsimile machine communicating with a counterpart facsimile machine through a gateway, comprising:

a timing monitor section which sets an appointed timer value into a timer and monitors whether said facsimile machine received a response signal from said counterpart facsimile machine within said timer value; and a signal receiving section which receives a prescribed signal from said gateway and instructs said timing monitor section to re-set said timer value into said timer when said prescribed signal is received before the time indicated by said timer value passed.

2. The facsimile machine according to claim 1, wherein said prescribed signal is receive not ready (RNR) signal.

3. The facsimile machine according to claim 1, moreover comprising:

a reply signal transmitting section which transmits a prescribed response signal to said gateway with said timer value is re-set.

4. The facsimile machine according to claim 3, wherein said prescribed reply signal is receive ready (RR) signal.

5. A method of conducting facsimile communication between a facsimile machine and a counterpart facsimile machine through a gateway, comprising the steps of:

setting an appointed timer value into a timer of said facsimile machine;

monitoring whether said facsimile machine received a response signal from said counterpart facsimile machine within the time indicated by said timer value;

re-setting said timer value into said timer when said facsimile machine received a prescribed signal from said gateway before the time indicated by said timer value passed; and re-monitoring whether said response signal is received.

6. The method of conducting facsimile communication according to claim 5, wherein said prescribed signal is receive not ready (RNR) signal.

7. The method of conducting facsimile communication according to claim 5, moreover comprising the step of:

transmitting a prescribed reply signal to said gateway by said facsimile machine with said timer value is re-set.

8. The method of conducting facsimile communication according to claim 7, wherein said prescribed reply signal is receive ready (RR) signal.

* * * * *